United States Patent
Sandor et al.

(10) Patent No.: US 10,120,864 B2
(45) Date of Patent: Nov. 6, 2018

(54) METHOD AND SYSTEM FOR IDENTIFYING USER ISSUES IN FORUM POSTS BASED ON DISCOURSE ANALYSIS

(71) Applicant: Conduent Business Services, LLC, Dallas, TX (US)

(72) Inventors: Ágnes Sandor, Meylan (FR); Nikolaos Lagos, Grenoble (FR); Caroline Brun, Grenoble (FR); Ngoc Phuoc An Vo, Grenoble (FR)

(73) Assignee: Conduent Business Services LLC, Dallas, TX (US)

( * ) Notice: Subject to any disclaimer, the term of this patent is extended or adjusted under 35 U.S.C. 154(b) by 225 days.

(21) Appl. No.: 15/083,504

(22) Filed: Mar. 29, 2016

(65) Prior Publication Data

US 2017/0286396 A1 Oct. 5, 2017

(51) Int. Cl.
*G06F 17/00* (2006.01)
*G06F 17/27* (2006.01)
*G06F 17/30* (2006.01)

(52) U.S. Cl.
CPC .......... *G06F 17/279* (2013.01); *G06F 17/271* (2013.01); *G06F 17/2785* (2013.01); *G06F 17/30477* (2013.01); *G06F 17/274* (2013.01)

(58) Field of Classification Search
CPC combination set(s) only.
See application file for complete search history.

(56) References Cited

U.S. PATENT DOCUMENTS

| | | | |
|---|---|---|---|
| 7,058,567 B2 | 6/2006 | Aït-Mokhtar et al. | |
| 9,626,629 B2* | 4/2017 | Vijayaraghavan | G06N 99/005 |
| 2014/0067370 A1 | 3/2014 | Brun | |
| 2014/0129536 A1 | 5/2014 | Anand et al. | |
| 2016/0203120 A1* | 7/2016 | Boguraev | G06F 17/2735 704/9 |

OTHER PUBLICATIONS

Aït-Mokhtar, et al., "Robustness beyond shallowness: incremental deep parsing," Natural Language Engineering, 8(2-3), pp. 121-144 (2002).

Aït-Mokhtar, "Incremental Finite-State Parsing," Proc. 5th Conf. on Applied Natural Language Processing (ANLP '97), pp. 72-79 (1997).

Aït-Mokhtar, et al., "Subject and Object Dependency Extraction Using Finite-State Transducers," Proc. 35th Conf. of the Association for Computational Linguistics (ACL '97) Workshop on Information Extraction and the Building of Lexical Semantic Resources for NLP Applications, pp. 71-77 (1997).

(Continued)

*Primary Examiner* — Vu B Hang
(74) *Attorney, Agent, or Firm* — Fay Sharpe LLP

(57) ABSTRACT

A method for categorizing an issue includes, for each of a plurality of categories of issue, providing at least one discourse pattern for identify text sequences that meet the discourse pattern. At least one of the discourse patterns specifies that an instance of a domain term in a domain term vocabulary be present in the text sequence for the pattern to be met. An issue is received which includes a text sequence. The text sequence is categorized based on which, if any, of the discourse patterns are met by the text sequence of the received issue. Information based on the categorization of the text sequence is output.

17 Claims, 9 Drawing Sheets

(56) References Cited

OTHER PUBLICATIONS

Baldwin, et al., "Automatic thread classification for Linux user forum information access," Proc. 12th Australasian Document Computing Symp. (ADCS 2007), pp. 72-79 (2007).
Fan, et al., "LIBLINEAR: A Library for Large Linear Classification," J. Mach. Learn. Res. 9, pp. 1871-1874, (2008).
Kim, et al., "Tagging and linking web forum posts," Proc. 14th Conf. on Computational Natural Language Learning, pp. 192-202 (2010).
Li, et al., "Learning question classifiers," Proc. 19th Int'l Conf. on Computational Linguistics (COLING '02), vol. 1, pp. 1-7 (2002).
Loni, "A survey of state-of-the-art methods on question classification. Literature Survey," TU Delft Repository, pp. 1-39, (2011) available at http://repository.tudelft.nl/assets/uuid:8e57caa8-04fc-4fe2-b668-20767ab3db92/A_Survey_of_State-of-the-Art_Methods_on Question_ Classification.pdf.
McCallum, "Mallet: A Machine Learning for Language Toolkit," pp. 1-3 (2002), available at http://mallet.cs.umass.edu.
Medem, et al., "Troubleminer: Mining network trouble tickets," IFIP/IEEE Int'l Symp. on Integrated Network Management-Workshops (IM'09), pp. 113-119 (2009).
Mukherjee, et al., "Help Yourself: A Virtual Self-Assist Agent," Proc. Companion Publication of the 23rd Int'l Conf. on World wide web (WWW '14 Companion), pp. 171-174 (2014).
Raghavan, et al., "Extracting Problem and Resolution Information from Online Discussion Forums," COMAD, p. 77-87 (2010).
Steyvers, et al., "Probabilistic Topic Models," in T. Landauer, et al. (eds), Handbook of Latent Semantic Analysis: A Road to Meaning, vol. 427, issue 7, pp. 424-440 (2007).
Sondhi, et al., "Shallow information extraction from medical forum data," Proc. 23rd Int'l Conf. on Computational Linguistics: Posters, pp. 1158-1166 (2010).
Wang, et al., "The Utility of Discourse Structure in Identifying Resolved Threads in Technical User Forums," COLING, pp. 2739-2756 (2012).
Wang, et al., "Predicting thread discourse structure over technical web forums," Proc. Conf. on Empirical Methods in Natural Language Processing, pp. 13-25 (2011).
Topic Modeling, pp. 1-5, (2013), downloaded at http://mallet.cs.umass.edu/topics.php on Mar. 3, 2016.

* cited by examiner

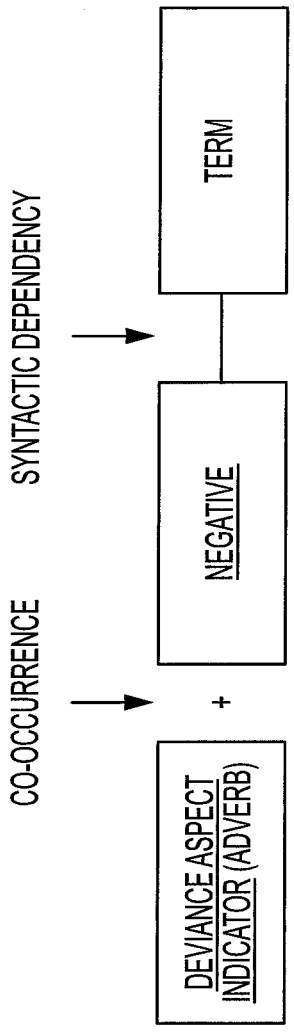

FIG. 7

Example:

*For some reason*[di], *Image Capture*[term] *doesn't*[neg] *always*[di], <u>update</u>

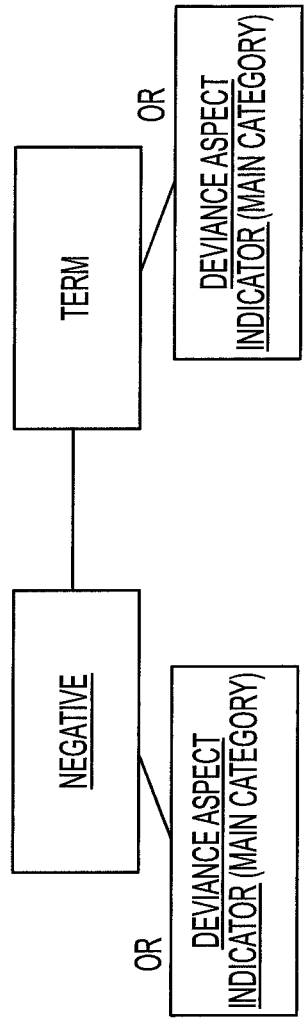

FIG. 8

Examples:

*I have to login to different wireless networks like this very frequently, and none*[neg] *of the* captive portals [term] *seem*[dai] *to remember my login/ password information*

*It* <u>*sounds*</u>[dai] *like I can't* [neg] *really merge the MobileMe*[term] *data into my existing apple/iCloud account*

METHOD AND SYSTEM FOR IDENTIFYING USER ISSUES IN FORUM POSTS BASED ON DISCOURSE ANALYSIS

BACKGROUND

Aspects of the exemplary embodiment relate to discourse analysis and find particular application in connection with a system and method for categorizing particular types of issues in technical forum posts.

Organizations often provide automated and semi-automated question answering systems to assist customers with a variety of tasks, such as selecting a suitable product to meet the user's criteria, troubleshooting a problem with a device or a medical condition, and the like. Developing such systems from scratch often involves the creation of a structured knowledge base in which questions are associated with possible answers. However, this can be extremely time consuming and often still leaves gaps, particularly when products are modified or new ones introduced.

There is wealth of knowledge available from a disparate range of online resources, such as web forums. Forum users often introduce new problems and solutions, which may related to new devices, and they describe first hand user experiences with rich information in terms of which solutions are better than others and why. This creates new opportunities for organizations seeking to automate parts of user support and customer care services. However, it also creates challenges in being able to transform such noisy and, frequently, unstructured data into a form that is useful for the enterprise. Mining frequently discussed problems, identifying trends, and enriching a corresponding knowledge base, for example, prove difficult with this type of data.

Various attempts at mining forum posts have made for various purposes. Raghavan, et al., "Extracting Problem and Resolution Information from Online Discussion Forums," COMAD, p. 77, 2010, hereinafter, Raghavan 2010, describes a method that distinguishes between problem and solution posts where the forum structure does not indicate it. A CRF classifier is trained, based on discourse move annotated technical forum corpora. The classifier distinguishes between relevant discourse moves, which describe problems, problem queries, suggest solutions and resolution steps, and those that are irrelevant for the classification, like greetings and messages to the author.

Others have used techniques for dialogue act tagging and coherence-based discourse analysis to identify and link problem and solution pairs in troubleshooting forum posts. See, Kim, et al., "Tagging and linking web forum posts," Proc. 14th Conf. on Computational Natural Language Learning, pp. 192-202, 2010; and Wang, et al., "Predicting thread discourse structure over technical web forums," Proc. Conf. on Empirical Methods in Natural Language Processing, pp. 13-25, 2011. Links are labeled according to their relationship to the previous discourse act, e.g., as ADD, CONFIRMATION, CORRECTION, etc. These discourse markers are then used in the detection of resolved problems. See, Wang, et al., "The Utility of Discourse Structure in Identifying Resolved Threads in Technical User Forums," COLING, pp. 2739-2756, 2012.

Identifying and characterizing forum threads have been studied for the classification of troubleshooting threads. One approach distinguishes between specific vs. general problems, the complete or not complete initial post in the thread, and resolved or not resolved threads. See, Baldwin, et al., "Automatic thread classification for Linux user forum information access," Proc. 12th Australasian Document Computing Symp. (ADCS 2007), pp. 72-9, 2007 (hereinafter, Baldwin 2007). Another performs clustering of similar troubleshooting posts and builds hierarchies among post types. See, Medem, et al., "Troubleminer: Mining network trouble tickets," IFIP/IEEE Intl Symp. on Integrated Network Management-Workshops (IM'09), pp. 113-119, 2009,.

Investigations that aim at identifying and typing sentences/sections in forum posts are described in Sondhi, et al., "Shallow information extraction from medical forum data," Proc. 23rd Intl Conf. on Computational Linguistics: Posters, pp. 1158-1166, 2010. CRF and SVM classifiers are used to distinguish between sentences describing physical examination and those describing medication. Mukherjee, et al., "Help Yourself: A Virtual Self-Assist Agent," Proc. Companion Publication of the 23rd Intl Conf. on World Wide Web (WWW '14 Companion), pp. 171-174, 2014, extracts segments from documents. Here, each segment corresponding to a different topic found in the document is defined as a basic intent.

A review of question classification in question answering systems is provided in Loni, "A survey of state-of-the-art methods on question classification. Literature Survey," TU Delft Repository, pp. 1-39, 2011. Loni defines question classification as the task of predicting the entity type or category of the expected answer. However, traditional question answering does not deal with identifying and extracting the questions from unstructured text, but only typing them. Li, et al., "Learning question classifiers," Proc. 19th Int'l Conf. on Computational Linguistics (COLING '02), Vol. 1, pp., 1-7, 2002, proposes a taxonomy. But this is oriented towards open domain information retrieval and the categories are not necessarily useful in other domains.

There remains a need for a categorization framework for issues which focuses on the type of answer being sought.

INCORPORATION BY REFERENCE

The following references, the disclosures of which are incorporated herein in their entireties by reference, are mentioned.

U.S. Pub. No. 20140129536, published May 8, 2014, entitled DIAGNOSING INCIDENTS FOR INFORMATION TECHNOLOGY SERVICE MANAGEMENT, by Rangachari Anand, et al.

U.S. Pub. No. 20140067370, published Mar. 6, 2014, entitled LEARNING OPINION-RELATED PATTERNS FOR CONTEXTUAL AND DOMAIN-DEPENDENT OPINION DETECTION, by Caroline Brun.

BRIEF DESCRIPTION

In accordance with one aspect of the exemplary embodiment, a method for categorizing an issue includes, for each of a plurality of categories of issue, providing at least one discourse pattern for identify text sequences that meet the discourse pattern. At least one of the discourse patterns specifies that an instance of a domain term in a domain term vocabulary be present in the text sequence for the discourse pattern to be met. An issue including a text sequence is received. The text sequence is categorized based on which of the discourse patterns are met by the text sequence of the received issue. Information based on the categorization of the text sequence is output.

One or more of the steps of the method may be performed with a processor.

In accordance with one aspect of the exemplary embodiment, a system for categorizing issues includes a domain term vocabulary which includes a plurality of domain terms. Memory is provided which, for each of a plurality of categories of issue, stores at least one discourse pattern for identify patterns that are met by a text sequence. At least one of the patterns specifies that an instance of one of the domain terms be present in the text sequence for the pattern to be met. A syntactic parser identifies syntactic dependencies in an issue comprising a text sequence. A discourse pattern extraction component determines which of the discourse patterns are met by the text sequence. A categorization component categorizes the text sequence based on the discourse patterns which are met. An output component outputs information based on the categorization of the text sequence.

In accordance with one aspect of the exemplary embodiment, a method for categorizing an issue incudes providing a vocabulary of domain terms. For each of a plurality of categories of issue, at least one discourse pattern is provided for identify text sequences that met the pattern, the issue categories including at least one information request category and an anomaly category, at least one of the anomaly category discourse patterns being met when an instance of one of the domain terms in the domain term vocabulary is in a syntactic relation with another term in the in the text sequence. A text sequence is received. The text sequence is categorized based on the discourse patterns that are met by the text sequence. Where the text sequence meets a discourse pattern for the anomaly category, the text sequence is processed by a first procedure and where the text sequence meets a discourse pattern for the information request category, the text sequence is processed by a second procedure, different from the first procedure.

One or more of the steps of the method may be performed with a processor.

BRIEF DESCRIPTION OF THE DRAWINGS

FIG. 7 shows a general pattern of anomaly descriptions constituted by syntactically related and co-occurring lexical, grammatical and discourse elements;

FIG. 8 shows a pattern of anomaly descriptions constituted by multiple co-occurring deviance aspect indicators and a predication containing a term;

DETAILED DESCRIPTION

Aspects of the exemplary embodiment relate to a discourse analysis system and method for extracting information relating to user issues and request types in text, such as technical forum question posts. The method supports up-to-date knowledge generation in organizations that provide (semi-) automated customer-care services and enriching forum metadata, in order to enhance the effectiveness of search.

The system enables detection and categorization of different types of issue found in question posts, based on discourse analysis. Discourse-related features extracted by discourse patterns used herein are compared to a baseline relying on standard linguistic features and show significant advantages. The discourse-related features are especially useful when dealing with complex concepts, such as anomalies expressed in question post threads.

Figure 1:
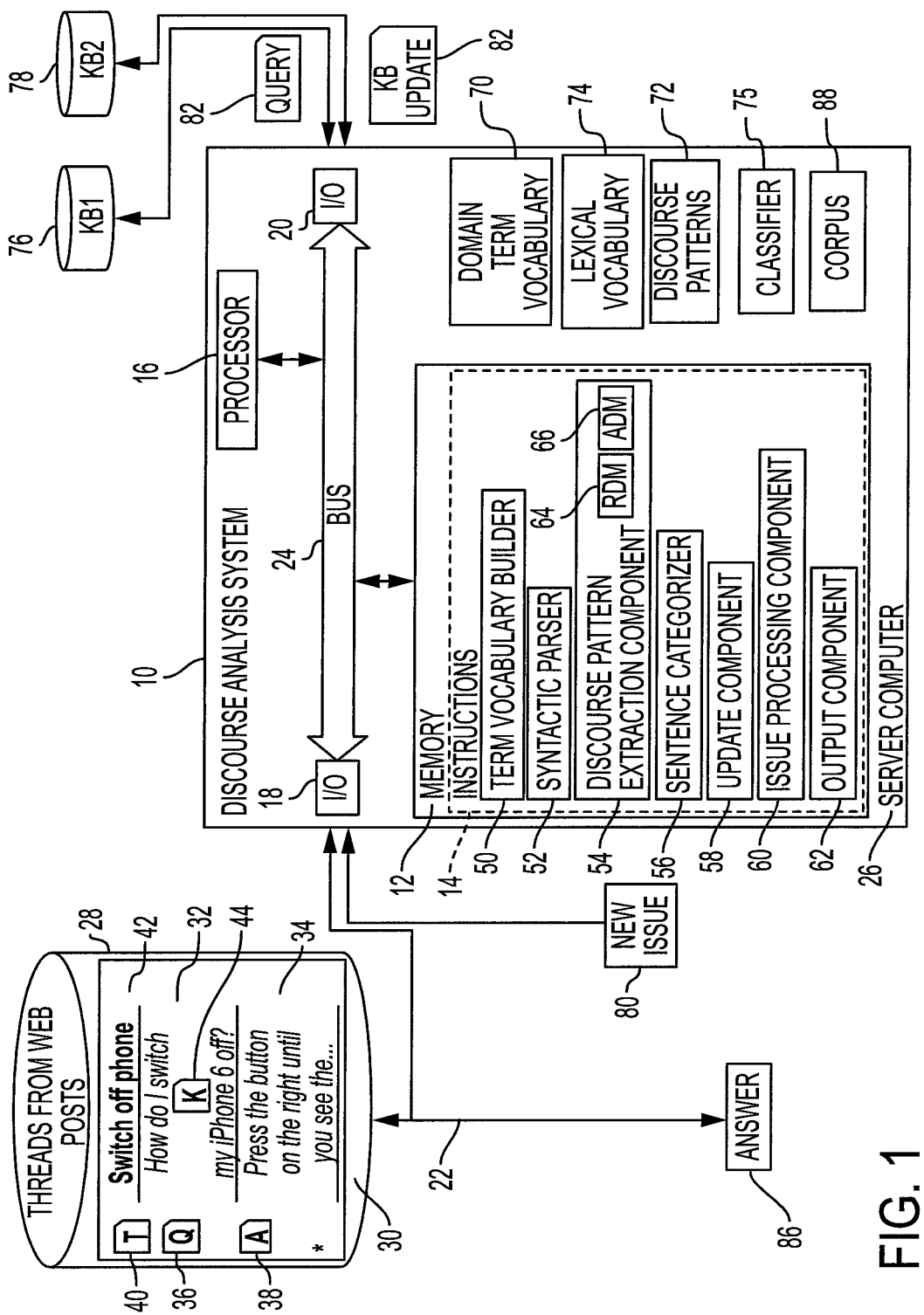
FIG. 1 is a functional block diagram of a discourse analysis system in accordance with one aspect of the exemplary embodiment.

FIG. 1 illustrates a computer-implemented discourse analysis system 10. The illustrated computer system 10 includes memory 12 which stores software instructions 14 for performing the method illustrated in FIG. 2 and a processor 16 in communication with the memory for executing the instructions. The system 10 also includes one or more input/output (I/O) devices 18, 20 for communicating with external devices, e.g., via wired or wireless links 22, such as a local area network or a wide area network, such as the Internet. The various hardware components 12, 16, 18, 20 of the system 10 may all be connected by a data/control bus 24.

The computer system 10 may include one or more computing devices 26, such as a PC, such as a desktop, a laptop, palmtop computer, portable digital assistant (PDA), server computer, cellular telephone, tablet computer, pager, combination thereof, or other computing device capable of executing instructions for performing the exemplary method.

The system has access to a collection 28 of threads obtained from web posts, which may be stored in memory 12 during processing. Each thread 30 in the collection generally includes an issue 32, includes one or more text sequences (e.g., sentences), in a natural language having a grammar, such as English, that was posted by a person seeking an answer. Each issue may include a description of an anomaly and/or request information, e.g., as a question. The issue may relate to a device. Each of the sentences of the issue may be processed by the system. The thread 30 also includes one or more answers 34, posted by another person or other people. Each answer 34 generally attempts to provide an answer the question 32. Each answer may be in natural language and/or include graphics which illustrate the answer. The thread 30 may have metadata, e.g., XML tags, which provide information, such as one or more of: tags 36, 38 indicating the parts of the post corresponding to an issue and an answer to that question, respectively, a title tag 40 for a title 42 of the post, keyword tags 44, voting tags by other users, a rank, and the like.

The illustrated software instructions 14 include a term vocabulary builder 50, a syntactic parser 52, a discourse pattern extraction component 54, a sentence categorizer 56, optionally one or more of an update component 58 an issue processing component 60, and an output component 62. The discourse pattern extraction component 54 may include one or more discourse models 64, 66.

Briefly, if one is not already available, the term vocabulary builder 50 builds a vocabulary 70 of domain terms that are relevant to a domain of interest. These terms may refer to products or other items that are the subject of the threads 28 and may be extracted from the threads. The syntactic parser 52 processes sentences in the issue part 32 of the thread 30 to identify parts of speech for tokens (e.g., words, punctuation, etc.) of the sentences and syntactic relations between them. The discourse pattern extraction component 54, which may be part of the syntactic parser, applies rules defining discourse patterns 72 for identifying question sentences that satisfy one or more of the discourse patterns. For example a request discourse model (RDM) 64 applies rules for patterns for identifying information requests in the sentences and an anomaly discourse model (ADM) 66 applies rules for discourse patterns identifying anomalies in the sentences. Some of the patterns specify co-occurrences between domain terms from the term vocabulary and other tokens in the question sentence, which in some instances may be specific tokens and in other cases may specify a lexical class associated with a set of lexical terms (words or phrases) in a lexical vocabulary 74. The lexical terms may be stored in their lemma (root) form and are instantiated in the sentences by any surface form of the lemma (unless some constraint is specified). For example, the lexical vocabulary 74 may specify the infinitive form of a verb, e.g., be, which can be realized by surface forms such as am, is, are, to be, and so forth in sentences.

Based on the identified issue sentence(s) and the patterns that are met, the sentence categorizer 56 categorizes the issue 32 according to a set of predefined issue categories, each category corresponding to a different type of issue. There may be at least two, or at least three, or four or more such categories. The categories may include at least one information request category (the poster of the question is seeking information about an item) and an anomaly category (the poster identifies an anomaly for an item, indicating that there may be an issue with the item which needs to be resolved). The categorization is based, a least in part, on the discourse patterns that fired. In one embodiment, the sentence categorizer 56 inputs a set of features for the issue sentence, including features related to the discourse patterns, into a classifier 75, which has been trained on such features to output a most probable category or a probabilistic distribution over some or all categories.

In one embodiment, the update component 58 is a knowledge base (KB) update component which uses the identified issue category for selecting one of a plurality of knowledge bases 76, 78 to be updated with an issue (e.g. a question) and corresponding answer, which may be derived, at least in part, from the answer 34 in the post 30. While two knowledge bases are illustrated by way of example, there may be fewer or more than two, such as one for each category of issue, or a single knowledge base in which some or all of the questions and associated answers are labeled with a respective one of the categories. The knowledge base(s) can be in any suitable form for providing answers to questions, such as trouble shooting knowledge bases, instructions for performing a task, product specifications, explanatory documents, and the like.

In another embodiment, the update component 58 is a forum update component which labels the issues 32 posted on a web forum with the respective identified issue categories.

The issue processing component 60 may receive as input a new issue 80 (e.g., from a web forum post) and call on the syntactic parser 52, pattern extraction component 54, and sentence categorizer 56 to process the new issue to identify the category of issue. The issue processing component 60 then selects an appropriate course of action for handling the categorized issue, based on the category. For example, where a text sequence meets a discourse pattern for the anomaly category, the text sequence (which may be the entire issue 32) is processed with a first procedure and where the text sequence (meets a discourse pattern for the information request category, the text sequence (which may be the entire issue 32) is processed with a second procedure, different from the first procedure. Example procedures include automatically generating a query 82 to submit to a selected one of the knowledge bases 76, 78 for retrieving one or more answers, proposing one of the knowledge bases to be used by a real or virtual agent for responding to the issue, identifying the category of issue to a real or virtual agent, and/or for routing the query to an appropriate real or virtual agent specified for handling issues in that category of issue.

The output component 40 outputs information from the system, which may depend on the specific purpose of the system. For example, the information output may include one or more of category labels for the issues 32, proposed updates 84 to one or more of the knowledge bases, the identity of a knowledge base for which a new question/answer could be generated, the answer 86 corresponding to the new issue 80, retrieved from the selected knowledge base, a flag which indicates that the assigned category for the issue is considered high (or low) priority and/or that responding to the issue should be prioritized/or not and/or handled by a real or virtual agent, or the like.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. Memory 12 stores instructions for performing the exemplary method as well as the processed data.

The network interface(s) 18, 20 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 16 can be variously embodied, such as by a single-core processor, a dual-core processor (or more generally by a multiple-core processor), a digital processor and cooperating math coprocessor, a digital controller, or the like. The digital processor 16, in addition to executing instructions 14 may also control the operation of the computer 26.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
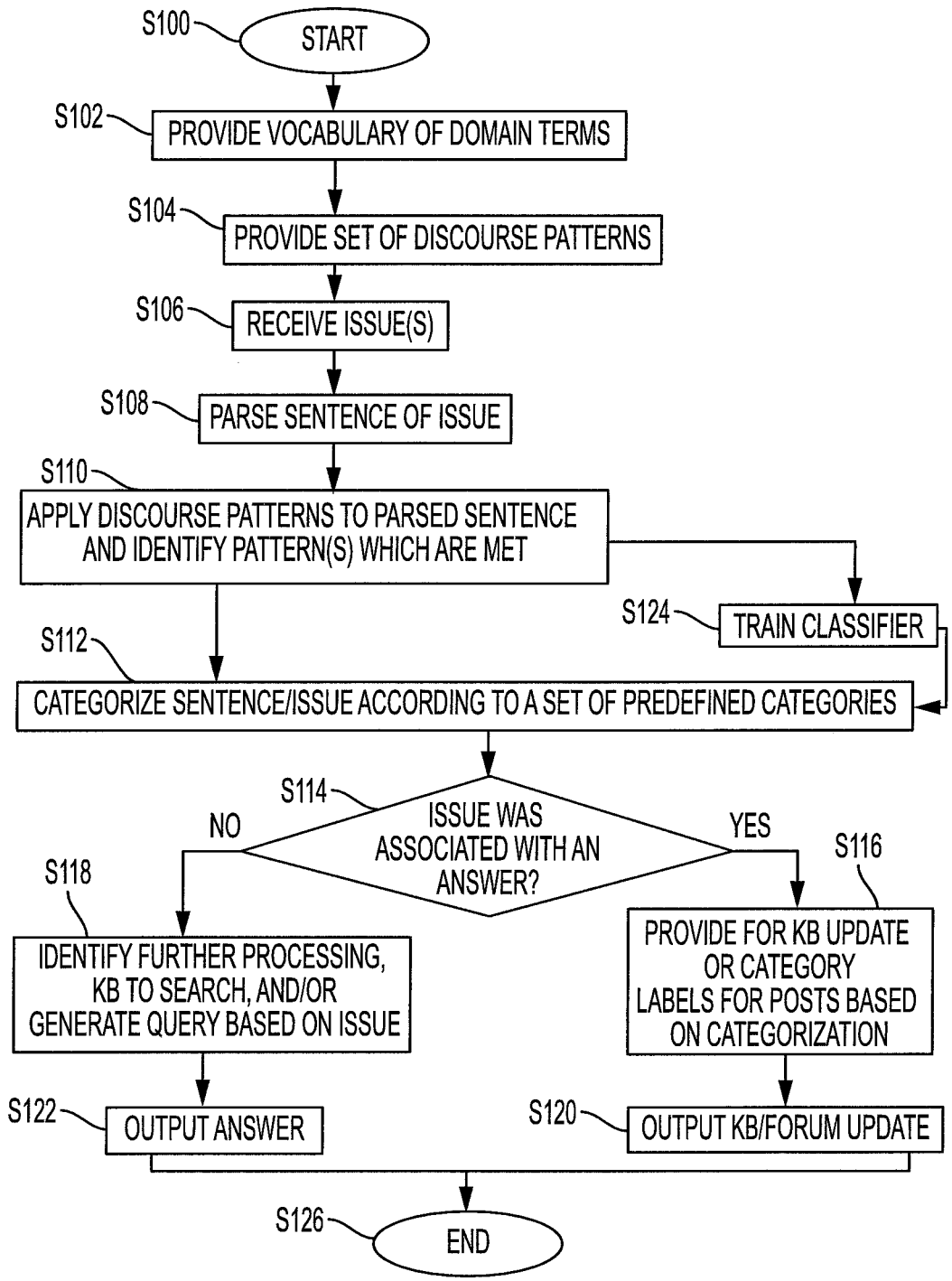
FIG. 2 is a flowchart illustrating a method for discourse analysis in accordance with another aspect of the exemplary embodiment.

FIG. 2 illustrates a method for processing issues which can be performed with the system of FIG. 1. The method begins at S100.

At S102, a vocabulary 70 of domain terms is provided, e.g., is built by the term vocabulary builder 50.

At S104, a set of discourse patterns is provided. These may have been manually or semi-automatically generated from a set of threads from question posts, such as collection 28.

At S106, a single issue 80 or a collection 28 of threads containing issues 32 is received.

At S108, for each issue 32 or 80, the sentences of the issue are each parsed, e.g., by the syntactic parser 52.

At S110, discourse patterns 72 are applied to the parsed issue 32, 80, e.g., by discourse pattern extraction component 54, and any patterns which are met by the sentence(s) of the issue are identified.

At S112, based on the pattern(s) 72 which are met by the issue 32, the issue is categorized according to a set of predefined categories, each category corresponding to a different type of issue.

If at S114, the issue 32 was extracted from a post 30, then the method proceeds to S116, where provision is made for updating a knowledge base or categorizing posts 28 on the web forum. In particular, the post may be used or proposed for use to update a knowledge base 76, 78 that may be selected based on the issue category. The update may include adding a new question and corresponding answer to the knowledge base, or, if a similar question is already in the knowledge base, a new answer may be generated or proposed for the question, based on the answer 34 in the post.

If at S112, the issue 80 was a new issue (i.e., one without an associated answer), then at S118, the assigned category may be used to select a knowledge base in which to search for an answer 84 to the question, to search in a common knowledge base or web forum posts for similar issues, limiting (or prioritizing) the search to issues labeled with the assigned category.

At S120 or S122, information is output, such as an update for the knowledge base/thread 30 or an answer to the new issue.

In one embodiment, at S124, the discourse patterns for one or more of the categories which fire on the collection of issue sentences are used as features, optionally together with other features extracted from the issue sentences, to train a classifier. The trained classifier(s) can be used in the categorization step S112 for making predictions for the respective category.

The method ends at S126.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 26, (for example, an internal hard drive of RAM), or may be separate (for example, an external hard drive operatively connected with the computer 26), or may be separate and accessed via a digital data network such as a local area network (LAN) or the Internet (for example, as a redundant array of inexpensive of independent disks (RAID) or other network server storage that is indirectly accessed by the computer 26, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details of the system and method will now be provided. To provide illustrative examples, the sentences used are drawn from the domain of Apple products, covering laptops, tablet computers, phones, memory storage devices, and the like. However, it is to be appreciated that the system and method are also applicable to other domains, such as household appliances, healthcare, and the like.

The exemplary system and method are able to detect two main categories of issues in sentences: anomaly descriptions and information requests. The detection of anomaly descriptions allows directing the workflow towards troubleshooting, including the detection of a root cause, which leads to the choice of a corresponding solution from a solution database. There may be several types of information request, for example, at least one or at least two of how-to, property, and explanation categories. The detection of various types of information request sentences helps to find dedicated knowledge bases that provide the answers. For example how to questions seek instructions, enquiries about the properties of devices need device specification resources, and enquiries for explanations may be answered based on specific explanatory documents.

Figure 3:
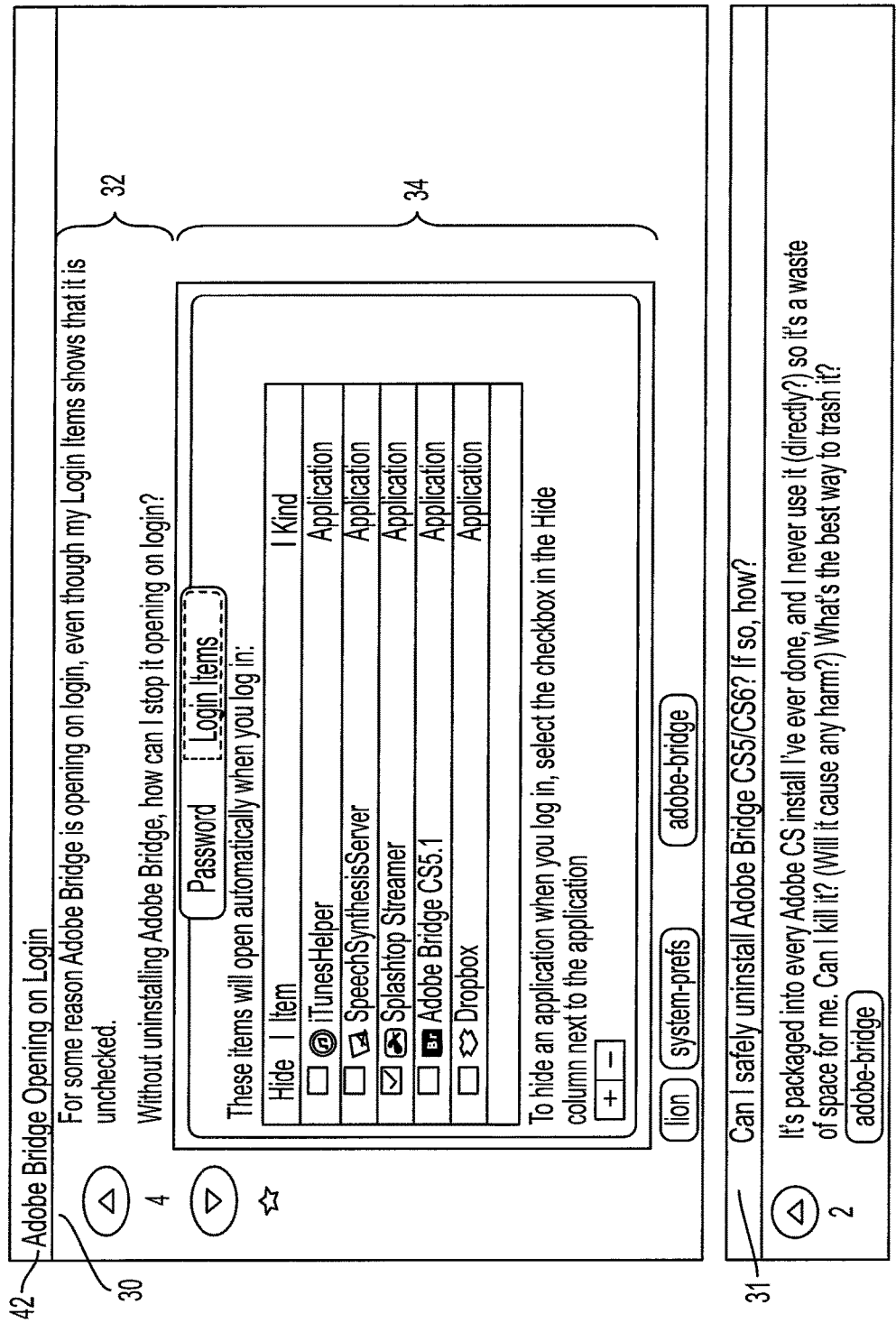
FIG. 3 illustrates web posts that share similar keywords and tags but refer to different intents.

As an example, consider the question post threads 30, 31 shown in FIG. 3 that are automatically linked as being related in an online forum based on the notions they include. Both threads share the tag Adobe Bridge and mention uninstalment. However in the first thread 30, the author experiences anomalous behaviour ("For some reason Adobe Bridge is opening on login, even though my Login items show that it is unchecked") and asks a question concerning ways for correcting the anomaly ("Without uninstalling Adobe Bridge how can I stop it opening on login"), while the second post 31 does not report any anomaly concerning the operation of the device. Rather, the user would like to know if it is possible to carry out an operation, namely uninstall Adobe Bridge, and if so, if it has any consequences and how it should be done ("Can I safely uninstall Adobe Bridge CS5/CS6? If so how?. . . Can I kill it? (Will it cause any harm?) What's the best way to trash it?"). Other users of the web forum could obtain the best solution for their needs more rapidly by filtering the posts according to the category of issue.

Identification of Device-Related Terms (S102)

In general, the terms in the vocabulary 70 are domain-specific terms. An exemplary method for extracting a set of domain terms from the data 28 uses topic modeling and TF-IDF jointly for finding the words which can be considered as domain specific terms.

Figure 4:
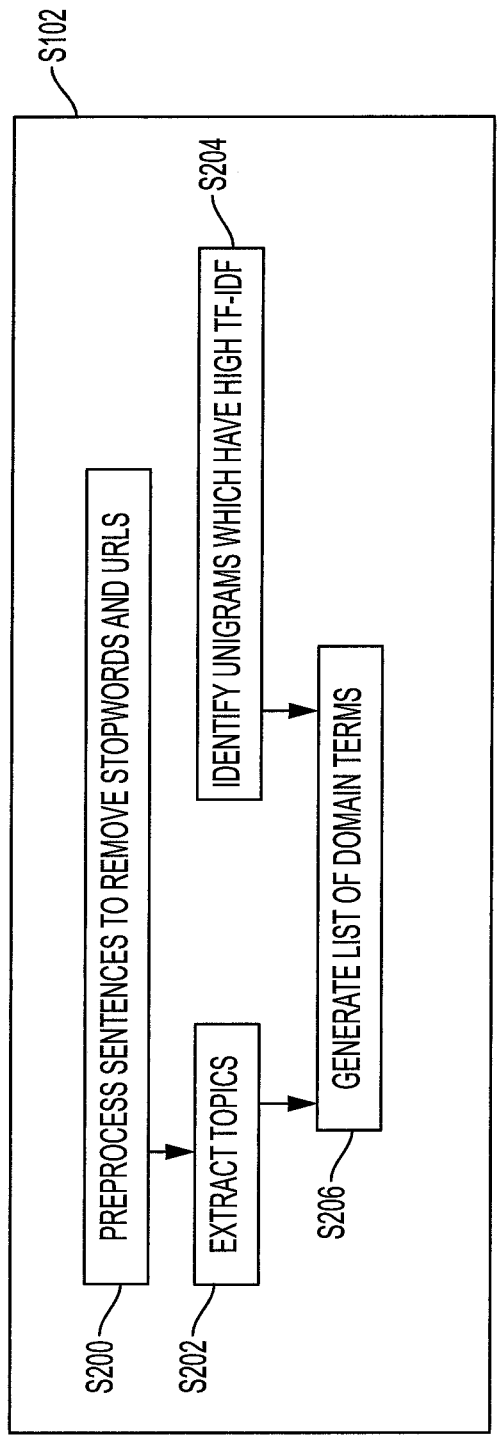
FIG. 4 is a flowchart illustrating extraction of domain terms in the method of FIG. 2.

For example, a corpus 88 of sentences is built from a collection of posts which may be sampled from the same web forum as posts 28 (and in some cases, may include the same posts). The method for extracting terms from the preprocessed sentences may proceed as shown in FIG. 4.

At S200, the corpus 88 is pre-processed to remove stopwords, for example using a standard list of stopwords, as well as URLs.

At S202, a list of topics associated with related words is extracted. A "topic" consists of a cluster of words that frequently occur together. Using contextual clues, topic models can connect words with similar meanings and distinguish between uses of words with multiple meanings. For a general introduction to topic modeling, see for example, Steyvers, et al., "Probabilistic Topic Models," in Handbook of Latent Semantic Analysis: A Road to Meaning, vol. 427, issue 7, pp. 424-440 (2007). A topic modelling method suitable for topic modelling is provided in the MAchine Learning for LanguagE Toolkit (MALLET). See McCallum, "MALLET: A Machine Learning for Language Toolkit, 2002, and Topic Modeling, at http://mallet.cs.umass.edu/topics.php.

In parallel with extracting topics (associated with related words) the most relevant words are identified using TF-IDF. The basic principle is twofold: (1) if a word appears frequently in a document, then it is relevant (Term Frequency), and (2) but if a word appears in many documents, it is not a unique identifier (Inverse Document Frequency). At S204, therefore, the term frequency-—nverse document frequency (TF-IDF) measure is computed to find the most relevant unigrams in the corpus, which are considered to be likely domain-specific terms. The list of unigrams may be sorted by TF-IDF score in descending order.

At S206, the results of S202 and S204 are used to identify a list of words considered as significant domain terms in the corpus. This list may be obtained as the combination of the list of related words associated with the topics extracted at S202 and the list of words associated with their TF-IDF scores obtained at S204.

Generation of Discourse Patterns (S104)

For each category of issue, a set of patterns 72 is provided. The patterns may be generated based on analysis of a development corpus of issue sentences, e.g., obtained from issues 32. The sentences may be manually annotated with respective issue categories. The sentences may be parsed with a parser such as parser 52, to identify parts of speech and syntactic dependencies. A suitable parser is the Xerox Incremental Parser (XIP), as described, for example, in Aït-Mokhtar, et al., "Robustness beyond shallowness: incremental deep parsing," Natural Language Engineering, 8(2-3), 121-144, 2002; Aït-Mokhtar, et al., "Incremental Finite-State Parsing," Proc. 5th Conf. on Applied Natural Language Processing (ANLP '97), pp. 72-79 (1997), and Aït-Mokhtar, et al., "Subject and Object Dependency Extraction Using Finite-State Transducers," Proc. 35th Conf. of the Association for Computational Linguistics (ACL '97) Workshop on Information Extraction and the Building of Lexical Semantic Resources for NLP Applications, pp. 71-77 (1997); and U.S. Pat. No. 7,058,567, issued Jun. 6, 2006, entitled NATURAL LANGUAGE PARSER, by Aït-Mokhtar, et al., the disclosures of which are incorporated herein by reference in their entireties.

XIP is a convenient tool for this task since its general language analysis functions can be built on-it provides rich lexical, morpho-syntactic and dependency information. Its rule formalism allows using and enriching linguistic features. For example, the parser 52 can include rules which tag instances of the domain-related terms in vocabulary 70, when they appear in the text. In one embodiment, terms that the users have tagged as being keywords, provided that they are nouns or noun phrases, may be labeled as domain terms, even if they do not appear in the vocabulary 70.

The complexity of the discourse patterns 72 may vary according to the issue category. The aim is to generate a set of patterns with high recall and precision, i.e., which, in combination, fire on a large proportion of the sentences that are manually tagged with the category, but which do not generally fire on sentences which are not.

In the exemplary embodiment, the information request sentences, such as HOWTO, PROPERTY and EXPLANATION, are signaled by surface linguistic patterns, i.e., by patterns that contain a relatively small set of lexical elements and syntactic structures. The sentences conveying ANOMALY are much more heterogeneous, and thus may employ a deeper analysis. Example patterns for each of the categories are now described.

A. Information Request Patterns

The following surface patterns (underlined in the examples) can be used to characterize the three different categories of information requests.

TABLE 1

Information Request Patterns

| TITLE | PATTERN TYPE | EXAMPLES |
|---|---|---|
| HOWTO | Direct or indirect question containing how + 1st person subject | How can I format Time Capsule? I wonder how I can turn off screen only of my MacBook without closing the lid, without waiting for the screensaver. |
| | Direct or indirect question containing how to or way | How to automatically login to captive portals on OS X? Also I am curious how to do thumbnails for the post Is there any way to force-enable it? |
| | Direct or indirect question containing the lemma do having the word what as its direct object | What do I have to do to my tracks to get the iTunes Album Art? |

TABLE 1-continued

Information Request Patterns

| TITLE | PATTERN TYPE | EXAMPLES |
|---|---|---|
| PROPERTY | Direct or indirect yes-no question (questions with a yes or no answer) | Are the devices returned in factory condition? Does iCloud have an email account/address that comes with it? We would like to know if Apple keeps track of iOS App opening by users. |
|  | Direct or indirect Wh-question, except for HOWTO | What could happen if I upgrade an iPod to iOS 5 and what is the likelihood it will happen)? How does Find my Mac work, since there's no GPS in a Mac? |
| EXPLANATION | Direct or indirect question containing why | Why don't desktops stay in order |
|  | Direct or indirect question where cause has a subject or an object | What can cause the phone to not automatically connect to a known access point? |

Example Rules for Information Request Patterns

The following simple surface patterns (underlined in the examples below) can be used to characterize information requests.

1. Detection of questions: questions can be identified with one of a set of rules, such as whether the sentence includes a question mark, or whether it corresponds to an indirect question, which may be based on the presence of one or more of a predefined set of lexical markers. Example rules for detecting that an issue sentence is a question include:

a. if a sentence contains a question mark (=form:fquest), and if it is a sentence (=SENT), it is rewritten as a question (=QUESTION):
   |#2[form:fquest,end]|
   if (^SENT(#1))
   QUESTION(#1).

b. If a sentence contains surface forms of the lemmas "wonder" and "I" where "I" is the subject of "wonder", then it is rewritten as a question:
   if (SUBJ-N (#1[lemma:wonder],#2[lemma:I]) & ^SENT(#3))
   QUESTION(#3).

c. If a sentence contains the expression "am looking for" and a surface form of the word "I" where "I" is the subject of "am looking", then it is rewritten as a question:
   if (SUBJ-N(#1[am looking for],#2[lemma:I]) & ^SENT (#3))
   QUESTION(#3).

A large number of other expressions of this type, such as I want to know, I need to know, I would like to know, I'm curious, and so forth in which the lemma "I" is the subject of a predefined set of question expressions (which may be stored in the lexical vocabulary 74 in the class "question expressions," can be converted into rules for identifying indirect questions, in a similar manner.

A sentence that is not identified as being a question with one of the question detection rules is considered simply as a "sentence" in the following rules.

2. HOWTO=Direct or indirect question (identified as described in (1)) containing one of:

a. how+1st person subject: A question contains the lemma "how" and any verb whose subject is "I" is labeled "howto":
   |#1[lemma:how]|
   if (^QUESTION(#2) & SUBJ(?,#3[lemma:I]))
   QUESTION[howto=+](#2).
   Examples:
   How can I format Time Capsule?
   I wonder how I can turn off screen only of my MacBook without closing the lid, without waiting for the screensaver.

b. how to/way: can be identified with one of the following:
   (i) A question contains "how to" or the lemma "way", can be captured with one of the following rules:
   |#1[how to]|
   if (^QUESTION(#2))
   QUESTION[howto=+](#2).
   |#1[lemma:way]|
   if (^QUESTION(#2))
   QUESTION[howto=+](#2)
   Examples:
   How to automatically login to captive portals on OS X?
   Also I am curious how to do thumbnails for the post
   Is there any way to force-enable it?
   (ii) a sentence or a question that contains the lemma "how" beginning a subordinate clause (=bg) followed by a non-finite verb (=iv), is rewritten as a question labeled "howto":
   |bg{#1[lemma:how]}, iv|
   if (^SENT(#2)|^QUESTION(#2))
   QUESTION[howto=+](#2).
   Examples:
   I just can't see how to make Contacts create a list of people and easily send an email to them without including a huge To c. the lemma do having the lemma what as its direct object:
   |#1[lemma:do]|
   if (^QUESTION(#2) & OBJ(?,#3[lemma:what]))
   QUESTION[howto=+](#2).
   If a question contains the lemma "what" as the direct object of the lemma "do", it is labeled "howto":
   if (OBJ(#1[lemma:do],#2[lemma:what]) & ^QUESTION (#3))
   QUESTION[howto=+](#3).
   Example:
   What do I have to do to my tracks to get the iTunes Album Art?

3. PROPERTY=Direct or indirect question which is one of:
   a. yes-no question: Questions (as identified in (1)) containing inverted subjects (=SUBJ[post]) are tagged "yes-no":
      if (^QUESTION(#1) & SUBJ[post](#2[aux],#3))
      QUESTION[yesno=+](#1).
   Then, if a yes-no question begins with (=startbis), the auxiliary "be" or "have" (=auxbh), it is labeled "property":
      |#1[auxbh,startbis]|
      if (^QUESTION[yesno](#2)^SENT(#2))
      QUESTION[property=+](#2).
   Example:
      Are the devices returned in factory condition?
   b. Wh-question (except for those that fire on HOWTO and EXPLANATION): A question (as identified in (1)) containing what, which, where, when, or who (=wh):
      |#1[lemma:wh]|
      if (^QUESTION(#2))
      QUESTION[property=+](#2).
   A wh-question, i.e., a question beginning with a wh-word (=[wh,startbis]), if it is not identified as an EXPLANATION, is labeled "property":
      |#1[wh,startbis]|
      if (^QUESTION[explanatory:~](#2))
      QUESTION [property=+](#2).
   Examples:
      What could happen if I upgrade an iPod to iOS 5 and what is the likelihood it will happen)?
      Where can I get my iPhone repaired?
   c. If-NP question: A question (as identified in (1)) containing the lemma if followed by a noun phrase NP)
      |bg{#1[lemma:if]}, np |
      if (^QUESTION(#2))
      QUESTION[property=+](#2).
   Example:
      We would like to know i f Apple keeps track of iOS App opening by users.
EXPLANATION=Direct or indirect question containing one of:
   a. Why. Any not HOWTO question (as defined above) or any sentence containing the lemma "why" is labelled "explanatory":
      |#1[lemma:why]|
      if (^QUESTION[howto:~](#2)^SENT(#2))
      QUESTION[explanatory=+](#2).
   Examples:
      Why don't desktops stay in order?
      Please explain why the screen went blank
   b. Direct or indirect question where cause has a subject or an object: If a sentence contains a dependency the first argument of which is "cause" and the second "what" (it can only be a subject or an object dependency), it receives the label "explanatory"
      if      ($1(#1[lemma:cause],#2[lemma:what])      &      ^QUESTION(#3))
      QUESTION [explanatory=+](#3).
   Example:
      What can cause the phone to not automatically connect to a known access point?
As will appreciated, different categories or information request may be considered, such a category seeking another user's opinion, which may be implemented by patterns looking for subjective words, such as Which is better?
B. Anomaly Description Patterns
   An ANOMALY may be defined as follows: "An ANOMALY is a deviation from normal (correct, usual, expected, good, etc.) behavior of the device-related reference as described by the author of the post. This means that the annotation of ANOMALY does not need to be aware of actual, real or intended normal behavior, but it needs to capture the author's point of view." The annotators providing the category annotations may be provided with this description. Even so, the discourse patterns signaling anomaly descriptions are sometimes difficult to identify since they are less apparent on the surface, and moreover it may be difficult to distinguish them from descriptions of negative phenomena that represent normal behavior. The anomaly category is thus associated with at least one discourse pattern for identifying a deviation from normal behavior of an instance of a domain term, expressed by the author of the issue.

Figure 5:
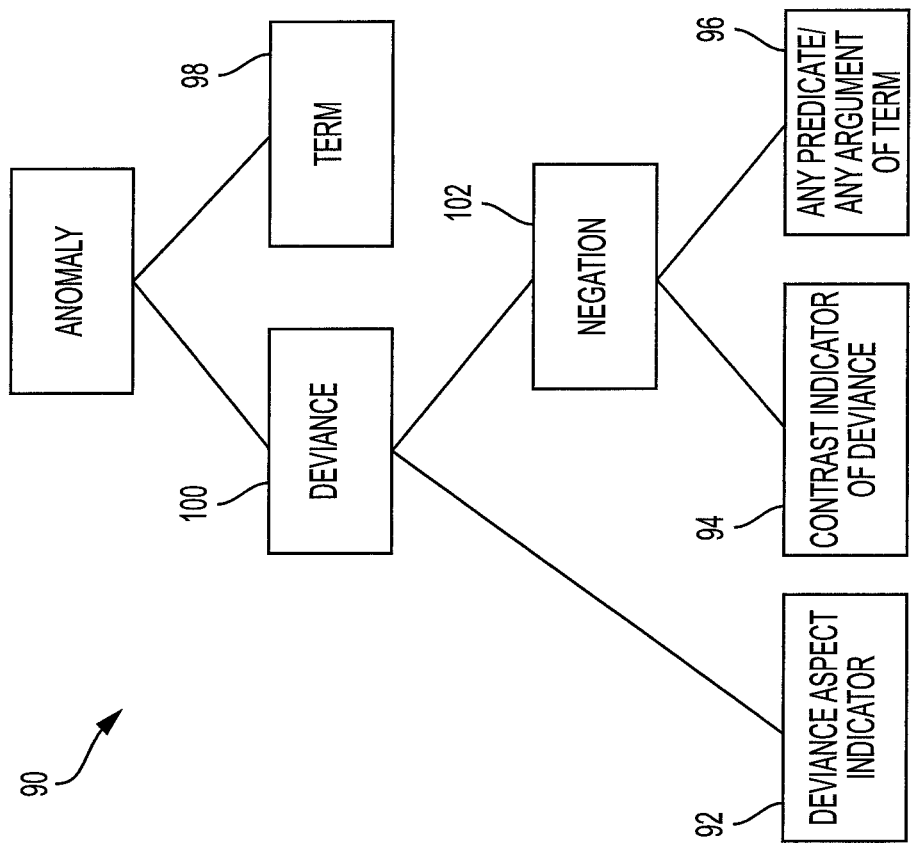
FIG. 5 illustrates a discourse model for the issue category ANOMALY.

According to the definition above, anomaly descriptions should include two basic meaning elements: a deviance-related element and a device-related reference (or other instance of a domain term). The basic ANOMALY pattern thus is the following:
   Anomaly=Deviance+Term
FIG. 5 is a schema which illustrates a discourse model 90 of the category ANOMALY which forms the basis of the exemplary discourse patterns for the anomaly category. The model includes four terminal meaning elements 92, 94, 96, 98: DEVIANCE ASPECT INDICATOR (randomness, uncertainty, etc.), CONTRAST INDICATOR OF DEVIANCE, any PREDICATE/ARGUMENT of TERM and TERM. They may all be present in anomaly descriptions, or the first three elements may merge in higher-level meaning elements. In particular, they may be merged in a single lexical unit 100 conveying DEVIANCE. CONTRAST INDICATOR OF DEVIANCE 94 and any PREDICATE/ARGUMENT 96 may be merged as a NEGATION unit 102.

Examples of sentences tagged as ANOMALY are as in which surface indicators of DEVIANCE are underlined, and the TERMs are in bold:
   (1) I'm seeing a ripple-like interference on an external display attached to my 2010 Mac Book Pro via VGA (Display adapter).
   (2) For some reason, Image Capture doesn't always update the list of devices after I plug in my iPhone.
   (3) These are all kept in full-screen mode and I have unchecked the setting to automatically rearrange spaces, yet whenever I restart my Mac the Spaces have changed order.

In the sentences, these meaning elements are instantiated as the lexical or syntactic units with various relationships. TABLE 2 illustrates how these meaning elements can be instantiated in features.

TABLE 2

Linguistic features associated with the meaning elements

| Meaning elements of ANOMALY | Feature |
| --- | --- |
| TERM | lexical |
| DEVIANCE | lexical |
| NEGATION | negation operation lexical |
| DISCOURSE INDICATOR | part of speech category (temporal adverbs) lexical |
| CONTRAST DISCOURSE INDICATOR | part of speech category (negative connectors) |

TABLE 2-continued

Linguistic features associated with the meaning elements

| Meaning elements of ANOMALY | Feature |
|---|---|
| PREDICATE | syntactic dependency (subject, object, subject attribute) |

The lexical features may define specific lexical terms (single words or longer expressions) or a class of lexical terms which allows any lexical term in the class (from the lexical vocabulary 74) to be used. Each class includes at least two terms. In the exemplary embodiment, the classes do not overlap, i.e., the terms in one class are not found in any of the other classes.

In the discourse model 90, the TERMs are terminal elements i.e., they are instantiated by lexical units. The TERMs are domain terms which are instances of a domain term in the term vocabulary 70. DEVIANCE may be conveyed either by terminal elements as in sentence (1) or by further complex discourse elements, as in sentences (2) and (3).

In the exemplary method, the discourse model 90 underlying the anomaly descriptions and the implementation of the anomaly detection module 66 are implemented as a set of rules.

Figure 6:
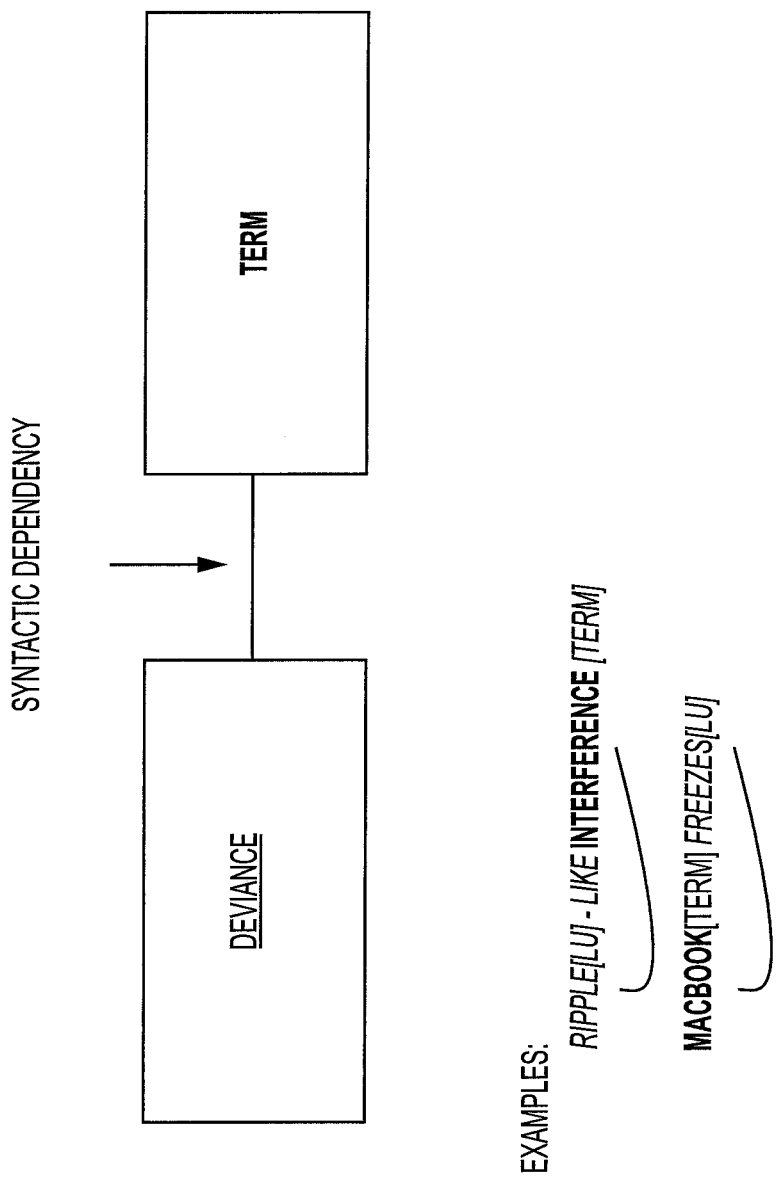
FIG. 6 shows a general pattern of anomaly descriptions constituted by syntactically related elements with particular semantic features.

Sentences (1) to (3) represent three main discourse patterns of anomaly descriptions. The difference between the three patterns is in the realization of the deviance-related element. In example (1) DEVIANCE is indicated through the lexical unit ripple-like. Its meaning inherently involves anomaly in the illustrative domain of Apple products, since ripples are not normal properties of a display.
Deviance+Term The discourse pattern matching anomaly descriptions as illustrated in sentence (1) consists of two sentence elements corresponding to the two main elements of anomaly descriptions: DEVIANCE and TERM. In the ANOMALY pattern, these two elements need to be in a syntactic dependency relation to ensure their semantic cohesion. The nature of the syntactic dependency as well as the order of the elements is irrelevant. FIG. 6 illustrates this pattern. In this embodiment, the DEVIANCE requirement is satisfied by any term stored in a deviance class and the TERM requirement is satisfied by any term in the domain term vocabulary 70. Deviance terms for the domain of computer products may include terms like freezes, crashes, and the like which are more likely to be found in sentences describing an anomaly than in other sentences.
Deviance Aspect Indicator+Negative+Term In sentence (2) the deviance involves the negative predicate doesn't . . . update.

This sentence element, however does not inherently convey DEVIANCE, as illustrated by other sentences where the same negative event may describe a normal behavior, as in:

> I believe this is an expected behavior. Although PWD doesn't update the path right away, if you do something else like cd . . . or even cd . you can see that the path gets updated.

In this discourse pattern of anomaly descriptions, the DEVIANCE meaning is distributed between two elements: NEGATIVE and a DEVIANCE ASPECT INDICATOR (DAI). The NEGATIVE element can be instantiated either by a grammatical operation (negation) or by lexical elements with negative meaning. NEGATIVE and TERM are in a syntactic dependency relation, which reflects their semantic cohesion. For the DAI, a syntactic dependency relation with either NEGATIVE or TERM is required if the DAI is instantiated by a main category lexical unit, otherwise co-occurrence is sufficient. The order of the elements is not relevant. FIG. 7 illustrates this pattern.

In sentence (2) the deviant character of the event is indicated, in addition to NEGATION, by For some reason and not always. These elements convey important aspects of the negative predicate, which indicate deviance from normal. For some reason indicates that the author does not know the cause of the event, which implies that she is uncertain if the event happens as expected, and not always indicates irregularity, which implies deviance from expected, regular behavior. (i.e., "deviation from normal (correct, usual, expected, good, etc.) behavior" in the definition of ANOMALY).
Negative (or DAI)+Term (or DAI)

FIG. 8 illustrates a pattern similar to that shown in FIG. 7, in which the negative element is conveyed by a Deviance Indicator of Contrast (DIG), and the term is part of any predicate dependency as any of the two arguments.

In some types of pattern, aspects of DEVIANCE (deviance aspect indicators), can be defined and each can be assigned a set of terms such as the respective underlined terms:

TEMPORAL PREDICATE (random, irregular, changing): sometimes, not always, random, unpredictable, not any more, stop, (dis)appear.

KNOWLEDGE-RELATED (uncertain knowledge of causes, of phenomena): for some reason, seems.

CONTRAST: yet, but, even, however.

EMPHASIS (pragmatic): keeps, constantly, simply, whenever.

Deviance Aspect Indicator+Deviance Indicator of Contrast+Any Predicate Or Argument+Term In sentence (3), the deviant event is have changed order, which does not contain any negative meaning element (present in the example lexical vocabulary 74). In this sentence, this negative element is conveyed by yet, a CONTRAST INDICATOR OF DEVIANCE. These three elements (PREDICATE, TERM and CONTRAST INDICATOR OF DEVIANCE), however, do not necessarily describe an anomaly, as in the following sentence:

Isn't '720 p'1280×720, yet the iPad 2 or mini is 1024× 768?

Figure 9:
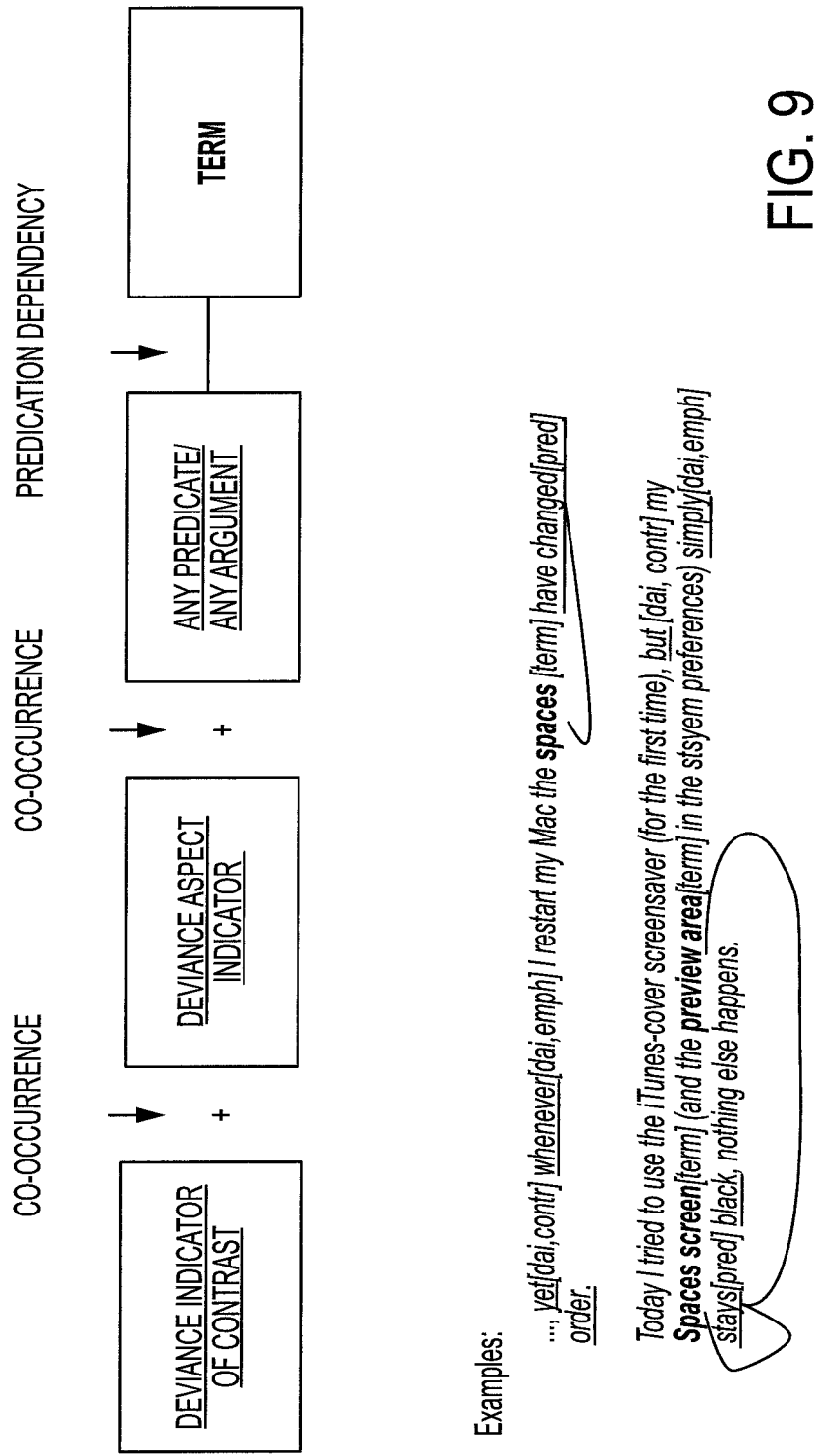
FIG. 9 shows a general pattern of anomaly descriptions constituted by multiple co-occurring deviance aspect indicators and a predication containing a term.
Figure 10:
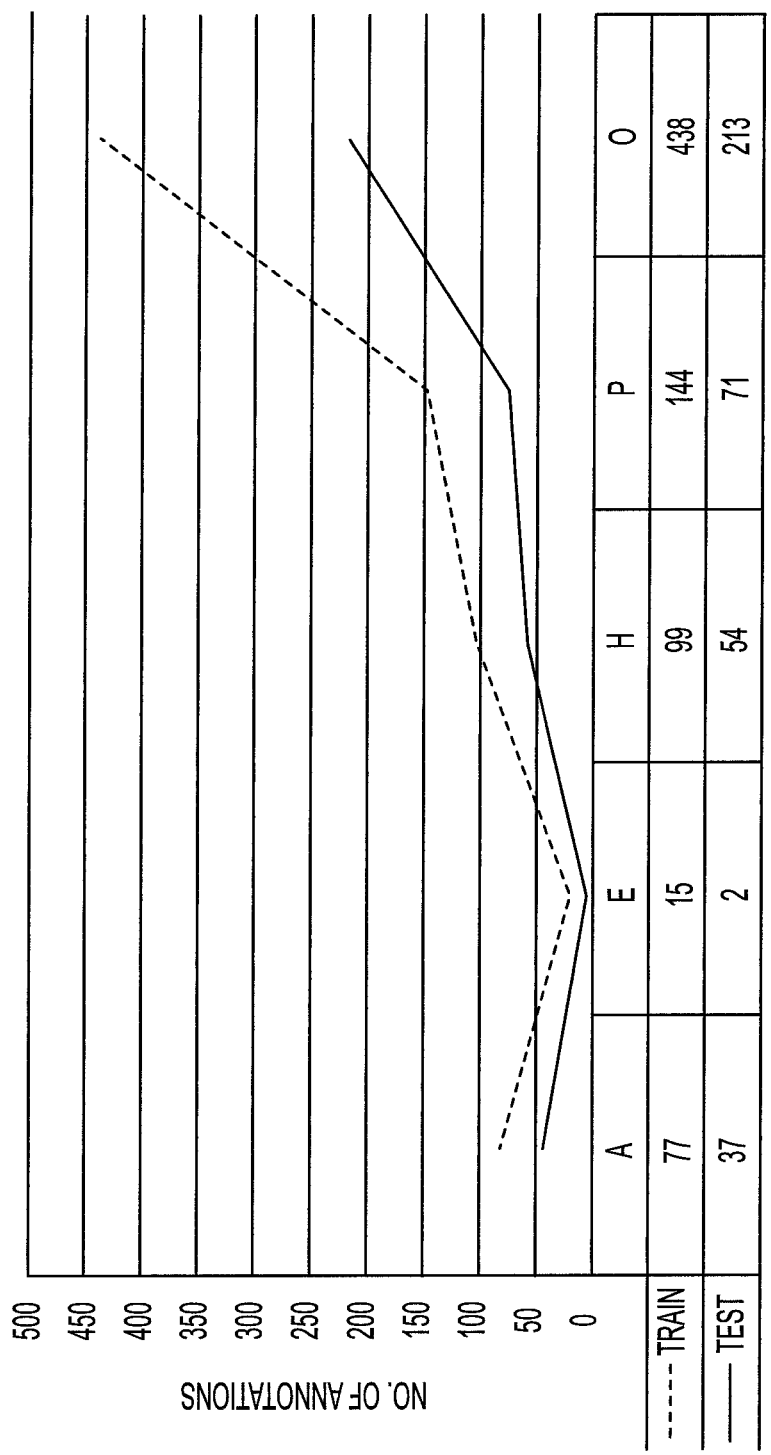
FIG. 10 is a graph showing distributions of annotations in the training and test corpora.

The anomaly pattern for sentences like sentence (3) contains an additional DEVIANCE ASPECT INDICATOR, of EMPHASIS, like whenever, which indicates repetition in an emphatic way, as a sign of frustration. Thus this pattern requires the co-occurrence of two DEVIANCE ASPECT INDICATORs, one of which conveying CONTRAST, the other being a predicate in a syntactic dependency with a TERM, as illustrated in FIG. 9. As for the previous patterns, the order of the elements is not relevant.
Example Anomaly Description Patterns Anomaly=Deviance+Term a. Any dependency except for appositions, sentential and temporal (=appos:~,sentence:~,temp_rel:~) containing a domain-specific term (=[dsw]) and a deviance word (=[bad,nobad:~] gets the label "badthing", meaning "deviance+term". FIG. 6 illustrates this pattern. Deviance words are listed in the lexicon. They have been manually gathered from the corpus. Some of them needed disambiguation. In their non-deviance meaning they are labelled as "nobad":

if (`$1[appos:~,sentence:~,temp_rel:~](#1[dsw],#2 [bad,nobad:~])|

^$1[appos:~,sentence:~, temp_rel:~](#1[bad,nobad:~], #2[dsw]))
$ 1[badthing=+](#1,#2).
Example:
I'm seeing a ripple-like interference on an external display attached to my 2010 Mac Book Pro via VGA (Display adapter).
b. (i) A sentence containing a dependency labeled "badthing" is rewritten as anomaly.:
if ($1[badthing](#1,#2) & ^SENT(#3))
ANOMALY(#3).
Example:
For some reason, Image Capture doesn't always update the list of devices after i plug in my iPhone.
(ii) If a sentence contains a word or longer expression conveying the meaning element "random", i.e., not expected (in this case "for some reason" and "doesn't always") and a dependency labelled "badthing", it is rewritten as anomaly. FIG. 8 illustrates this pattern. A lexicon of words and patterns labeled "random" may be constituted on grammatical grounds and stored in the lexical vocabulary 74.
if (WORD[random](#2) & ^SENT(#3) & $1[badthing] (#1,#4))
ANOMALY[random=+](#3).
Example:
I have created a number of desktops in which to keep Safari, Mail, iCal etc. These are all kept in full-screen mode and I have unchecked the setting to automatically rearrange spaces, yet whenever I restart my Mac the Spaces have changed order.
In this sentence "badthing" is the dependency (update, Image Capture), which has been created by a rule that labels a negative verb "bad":
c. If a sentence contains a "contrast" word and a "random" word and a subject dependency, except when the subject is "it", where the subject is a term, and where the "contrast" word precedes the "random" word in the sentence, then the sentence is rewritten as anomaly. A lexicon of words and patterns labeled "contrast" can be generated on grammatical grounds and stored in vocabulary 74.
if (WORD(#5[contrmark]) & WORD[random](#1) & ^SENT(#3)
& SUBJ(#2,#4[lemma:~]) & TERM(#4) & #5<#1)
ANOMALY[random=+](#3).
Example:
The memory was working, but for some reason it won't save the file.
Negative behavior (=$1[badthing]) in the Title of the post (=@_xtd.title->Test( )) can be identified by a pattern such as:
if (@_xtd.title->Test( ) & $1[badthing](#1,#2) & ^SENT (#3))
ANOMALY(#3).
Example:
Skype not working
The above are illustrative of exemplary patterns that can be used, singly or in combination, to categorize user questions. As will be appreciated, fewer, more, or different patterns may be used.

Syntactic Parsing (S108)

The input text is extracted from the issue part of a thread or is input as an issue. In some cases, the threads may not be labeled according to their parts (question/description, answer, etc.) In this case a method for automatic labeling of the parts may be used. For example, a CRF classifier, or other classifier may be trained to identify problem (issue) and solution (answer) parts of the thread. See, for example, Raghavan 2010 for a method that distinguishes between problem and solution posts where the forum structure does not indicate it using a trained CFR model.

The syntactic parsing can be performed in the same manner as for the pattern generation (S104) and thus may include, for each sentence, tokenizing the sentence to for a sequence of tokens, tagging the tokens with likely Parts of Speech, chunking the words to identify noun phrases and the like, and identifying syntactic relations between the tokens and/or chunks. Each syntactic relation is one of a predefined type which specifies the types of word/chunks in the relation. Example dependencies include Subject (identifies a noun or noun phrase and a verb for which the noun or noun phrase is the subject of that verb in the sentence), Object (which identifies a noun or noun phrase and a verb for which the noun or noun phrase is the object of that verb in the sentence), Predicate (which identifies a dependency between a predicate and a noun or noun phrase), and Negation (a syntactic relation between a noun or noun phrase and a negative, such as not, and forms thereof, such as doesn't, won't, can't). The parser may also perform coreference resolution (identifying the noun or noun phrase to which a pronoun refers from the same or a different sentence). This allows pronouns to be treated as the nouns and noun phrases to which they refer.

As noted above, the parser 52 may also apply the rules for identifying discourse patterns 72 (S110), using the patterns and the lexical and term resources 70, 74, or a separate component 54 may perform this function.

Sentence/Question Categorization (S112)

Each sentence of an issue may fire on one or more of the discourse patterns. The sentence may be categorized based on all the discourse patterns on which it fires. For example, it may be assigned a category label for each category for which it matches one of the patterns. The issue may be given a category label(s) based on the labels for each of the sentences it contains. If a sentence does not fire on any of the patterns, it may be assigned to a null category. In some embodiments, issues in which all sentences are labeled as null may be flagged and/or sent to a human for evaluation. In some embodiments, one or more of the categories may be considered of more significance than the other categories and may be assigned as the category on which further processing is to be based even if other categories are detected. For example, if a new issue receives an anomaly label for any of its sentences, the issue may be processed using the workflow established for anomalies, even if it also includes information request labels.

The method can be used for processing individual issues, such as issue 80, and/or a collection 28 of issues with associated answers, e.g., obtained from web posts. For a new issue 80, for which a user is seeking an answer, the categorization at S112 may be used to determine what type of further processing of the issue should be performed at S118. For an issue already associated with an answer, the subsequent processing at S116 may be different, for example, updating a knowledge base based on the issue and/or answer and the category label or providing a category label for the post from which the issue was extracted.

The system and method find application in a variety of fields, such as labeling of posts in a question answer forum for easier search by other users, labeling of issues for prioritizing or directing them for processing, Generation of new entries in a knowledge base. An advantage of the present method, when compared to supervised classification approaches, is that the method does not require a large number of annotated examples and is (partially) domain-independent (although not genre-independent) due, in part, to the discourse-based features. The exemplary method allows the most useful types of user issues and requests to be identified and extracted, and the sentences that convey them are thus detected.

In the case of web forums, for example, users often search for answers or solutions to their problems among the existing posts, and the usual search method involves using keywords or forum tags that represent a normalized form of query concepts. While keywords and tags characterize the posts through the set of notions that they include, they do not indicate the post types: Does the post describe an anomaly with the device? Does it enquire for a method to execute an operation, for some property of the device or for some explanation? Thus posts that share the same subject matter, i.e., that are characterized through the same set of keywords or tags, may differ in the motivation of the authors of the posts. The present method allows posts to be labeled according to issue type, facilitating search.

In a customer care setting, the system can assist knowledge base developers in designing and updating a knowledge base that will be used for responding to user requests. The category labels can be added as part of a document's metadata, i.e., a direct link is explicitly defined between a document and its type.

Further, in cases where a (semi-)automated system is used, the workflow that will be followed can be selected according to the type of issue. For example, if the issue is related to troubleshooting, then a dialog-based system may be used to conduct a dialog with the user that will try to identify a root cause and will use a corresponding knowledge base, while if the issue is related to a property of the device (e.g., what is the resolution of the screen) an answer can be given based on a match (i.e., closer to question answering) to the knowledge base holding device specifications.

In general, identifying user issue types is a valuable natural language understanding task for automated agents, especially in a troubleshooting context, when the process relies on existing knowledge bases. Corresponding results could also be used for data analytics projects. In the system could also be useful for advanced searching facilities in human agent based customer care centers.

Without intending to limit the scope of the exemplary embodiment, the following examples performance of the exemplary patterns in categorizing issue sentences.

EXAMPLES

Data

As there is no publicly available dataset, which would be appropriate for evaluation purposes, an annotated corpus was developed for the evaluation experiments.

The data 28 was obtained in XML form from the Ask Different website. Ask Different is a question and answer site for users of Apple hardware and software. From the data, 1000 posts and also the tags assigned by community members to each post, were retrieved. Out of the 1000 posts, 150 posts were annotated independently by three annotators with categories of interest. The annotation guidelines included the following descriptions of the categories (together with examples of each, as given above):

1. ANOMALY: is a deviation from normal (correct, usual, expected, good, etc.) behavior of the device-related reference as described by the author of the post. ANOMALY does not need to be aware of actual, real or intended normal behavior, but it needs to capture the author's point of view. The difficulty in identifying an ANOMALY is distinguishing it from the description of a normal or general negative property of the device-related reference. The test for deciding if a sentence conveys an ANOMALY perceived by the author is to check if the author's goal is to change the negative behavior described in a sentence.

2. INFORMATION REQUEST: three kinds of information need are:

a. HOW-TO: queries about procedural information of act that should be performed by the user b. PROPERTY: queries about information concerning the properties of the devices c. EXPLANATION: queries about the causes of the behavior of the device:

Each post should contain at least one issue sentence (such as an anomaly description or information request sentence), but it can contain multiple issue sentences. One issue sentence can contain more than category. An issue sentence must contain at least one device-related reference that presents an ANOMALY or is in the focus of an INFORMATION REQUEST. Device-related reference means explicit reference to a process, property, behavior, action, etc. related to a device. A device-related reference can be carried either by a content word or a pronoun, as in:

In some settings the screen may be illuminated, but the keyboard is not well-lit and hard to see, so I'd really like the backlight to turn on. Is there any way to force-enable it? (it refers to the backlight on the device mentioned in the previous sentence)

Information requests sometimes do not contain such an explicit reference. In these cases they should not be annotated, e.g., Can someone help me?

The only contexts that should be taken into account are those that are indicated by pronouns.

For ANOMALY, behavior can deviate from what would be perceived as appropriate according to various dimensions. TABLE 3 lists some typical dimensions and expressions of ANOMALY:

TABLE 3

Examples of Anomaly

| Dimension of ANOMALY | Example |
|---|---|
| Random behavior | For some reason, Image Capture doesn't always update the list of devices after I plug in my iPhone. |
| A specific circumstance provokes a negative behavior | I have a MacBook Pro. When it senses the ambient light is low, the backlit keyboard turns on, and there are keys that let me control its brightness. But when enough light reaches the ambient light sensor, the backlight turns off and I can't adjust it. |
| Unexpected behavior | I have created a number of desktops in which to keep Safari, Mail, iCal etc. These are all kept in full-screen mode and I have unchecked the setting to automatically rearrange spaces, yet whenever I restart my Mac the Spaces have changed order. |
| Undesired behavior | Instead, I have to first increase the backlight, then decrease it, in order to disable it. |
| Change of behavior | After purchasing a new computer (Mac Mini w/Lion) and migrating my settings from old one (Macbook Pro w/Snow Leopard), the system shortcuts for beginning-of-line and end-of-line text navigation commands (Cmd-left/right arrow) just don't work anymore, anywhere. |
| Behavior is repeated or persists | Terminal keeps giving me 'System is low on disk space/memory' error. |

TABLE 3-continued

Examples of Anomaly

| Dimension of ANOMALY | Example |
|---|---|
| Negative behavior in post title | POSTTITLE: Iphone 4 drains wifi 1 percent per minute |
| Author's uncertainty concerning the behavior | AND, to make matters worse, the machine seems to "think" that the backlight is off; because pushing the backlight dimming button (the one shared with F5) doesn't dim the keyboard backlight. |
| Obviously wrong behavior | I'm seeing a ripple-like interference on an external display attached to my 2010 Mac Book Pro via VGA (Display adapter). |

INFORMATION REQUEST is usually conveyed by a direct question, but it can also be conveyed by an indirect question or any statement conveying the author's desire to know something. The test for deciding if a statement is INFORMATION REQUEST is the possibility of transforming it into a question. Example expressions of the information request types and the questions they can be transformed to are shown in TABLE 4.

TABLE 4

Examples of Information Request Questions

HOW-TO

| Examples | Corresponding how-to question: How to . . . ? |
|---|---|
| Is there any way to force-enable it? | How to force-enable it? |
| How can I automatically login to captive portals on OS X? | How to automatically login to captive portals on OS X? |
| I'd like a quick way to start tethering using my iPhone, hopefully just using the keyboard. | How to start tethering using my iPhone, hopefully just using the keyboard. |
| I'd like to not only open all these documents but also to continue writing mathematical documents the same way I'm used to on Windows. | How to not only open all these documents but also to continue writing mathematical documents the same way I'm used to on Windows. |
| What do I need to do to keep my calendar and contacts synced across all my computers and devices, and how do I move them from my existing MobileMe account to my existing iCloud account? | How to keep my calendar and contacts synced across all my computers and devices, and how to move them from my existing MobileMe account to my existing iCloud account? |
| Could anyone give a simple steps to understand the work flow of Provisioning Portal process? | How to understand the work flow of Provisioning Portal process? |
| Can I create a user via the command line, or skip the setup assistant? (Note that this question is also categorized as "Property": if the answer is yes, then it answers a "how to" question, and if it's no, it answers a "Property" question) | How to create a user via the command line, or skip the setup assistant? |

PROPERTY

| Examples | Corresponding factual questions: What/Where is . . . ? Is it possible/there . . . ? Do/Does/Is . . . ? Corresponding evaluation questions: What/Which/Where . . . good/bad/better/worse . . . ? Do/Is/Will . . . good/bad/better/worse . . . ? |
|---|---|
| Are there any differences, feature-wise, between Safari for Mac and Safari for Windows? | What are the differences, feature-wise, between Safari for Mac and Safari for Windows? |
| This will always have to be an approximation, but on a Mac Book Pro with the 2.8 GHz processor, plugged in, and with the engine set to the maximum strength setting, what Elo is it? | This will always have to be an approximation, but on a Mac Book Pro with the 2.8 GHz processor, plugged in, and with the engine set to the maximum strength setting, what Elo is it ? |
| Can apps use different Twitter accounts on iOS? | Is it possible for apps to use different Twitter accounts on iOS? |
| I realize they're different numbers in the file name but is that enough to distinguish them? | I realize they're different numbers in the filename but is it possible to distinguish them by only using the numbers? |
| If it's possible to do this on iOS with all its restrictions, surely it must be possible to do something like it on OS X, right? | Is it possible to do something like it on OS X? |

TABLE 4-continued

Examples of Information Request Questions

| | |
|---|---|
| What advanced calendar scheduling canSiri do? | What advanced calendar scheduling is it possible for Siri to do? |
| Where can I find software for the Mac Classic? | Where is it possible to find software for the Mac Classic? |
| Does Apple keep track of iOS app opening? | Does Apple keep track of iOS app opening? |
| We would like to know if Apple keeps track of iOS App opening by users. | Does Apple keep track of iOS App opening by users? |
| If I copy the latest Touch Mobile Sync backup to the laptop will it clash/interfere with the iPad backup? | If I copy the latest Touch Mobile Sync backup to the laptop does it clash/interfere with the iPad backup? |
| Which editor works more seamlessly with OSX as far as speed, ease of use, OSX integration, and naturally intuitive keybindings? | Which editor works better with OSX as far as speed, ease of use, OSX integration, and naturally intuitive keybindings? |
| However, are there any benefits to disabling secure system memory? | What is good about disabling secure system memory? |
| Do non-retina graphics looks worse on a retina display than they did before? | Do non-retina graphics looks worse on a retina display than they did before? |
| Which iPad PDF viewers (annotators, readers, whatevers) give a faithful rendering? | Which iPad PDF viewers (annotators, readers, whatevers) give a good rendering? |
| Will updating to iOS 5 on a Mac be faster than doing it on a PC? | Will updating to iOS 5 on a Mac be better than doing it on a PC? |
| Any performance gains when disabling secure virtual memory? | Is performance better when disabling secure virtual memory? |
| Can I create a user via the command line, or skip the setup assistant? (see note above) | Is it possible to create a user via the command line, or skip the setup assistant? |

EXPLANATION

| Examples | Corresponding explanation questions: How does/is . . . ? Why . . . ? |
|---|---|
| How does "Find my Mac" work? | How does "Find my Mac" work? |
| What can cause the phone to not automatically connect to a known access point? | Why can it happen that the phone does not automatically connect to a known access point? |
| Why does iPhone Maps app sometimes ask to enable Wi-Fi for "accuracy", even though Location Services (GPS) is enabled? | Why does iPhone Maps app sometimes ask to enable Wi-Fi for "accuracy", even though Location Services(GPS) is enabled? |

The inter-annotator agreement is shown in TABLE 5.

TABLE 5

Inter-annotator agreement per category (Fleiss kappa)

| Category | annotators 1 + 2 | annotators 1 + 3 | annotators 2 + 3 |
|---|---|---|---|
| ANOMALY (A) | 0.635 | 0.652 | 0.622 |
| EXPLANATION (E) | 0 | 0.846 | 0 |
| HOWTO (H) | 0.796 | 0.768 | 0.791 |
| PROPERTY (P) | 0.796 | 0.882 | 0.82 |
| OTHER (O) | 0.784 | 0.829 | 0.793 |
| Average | 0.753 | 0.795 | 0.757 |

The inter-annotator agreement is consistently lower for the category "Anomaly," when compared to the rest of the categories. It is anticipated that this is due to the complexity of the concept. For the category "Explanation" there are two 0 values, because annotator 3 did not take into consideration this category. In the averages, the 0 values are not taken into account. After this step was completed, the three annotators were asked to find a consensus on the labels. This resulted in 1150 annotations, which were used as a gold standard corpus. TABLE 6 illustrates an example sentence for each annotation category.

TABLE 6

Examples of sentences for each annotation category

| Category | Example |
|---|---|
| ANOMALY | For some reason, Image Capture doesn't always update the list of devices after I plug in my iPhone. |
| HOWTO | How to automatically login to captive portals on OS X? |
| PROPERTY | What are the differences, feature-wise, between Safari for Mac and Safari for Windows? |
| EXPLANATION | How does "Find my Mac" work? |

100 posts were randomly selected as a training corpus and the remaining 50 posts as our test corpus. The distribution of the gold-standard annotations by category is shown in FIG. 9. It can be seen that the distribution of the annotations is similar in the two corpora.

To extract terms for the vocabulary 70, a corpus built from a collection of 1000 posts sampled from the Ask Different forum was used using the method described with reference to FIG. 4. Stopwords were removed using the standard list of stopwords in MALLET (McCallum, 2002), as well as URLs. The patterns were generated by manually annotating sentences in the development corpus for identifying discourse patterns that signal the sentence types, and for implementing them as rules using the Xerox Incremental Parser (XIP). Aït-Mokhtar, et al., "Robustness beyond shallowness: incremental deep parsing," Natural Language Engineering, 8(2-3), 121-144, 2002.

The patterns 72, as described above, were manually tested on a number of random examples from different technical corpora, and appear to cover all the types of anomaly descriptions encountered.

The discourse patterns were implemented in the XIP formulism, using various features and rules.

The information request patterns are implemented by rules that recognize direct and indirect questions based on part-of-speech categories and syntactic features provided by XIP (e.g., the presence of an interrogative pronoun, verbs introducing indirect questions, like wonder; inverted order of subject and verb) as well as on the presence of lexical units (e.g. how, how to, cause).

The meaning elements of ANOMALY are implemented as a heterogeneous feature set used in syntactic and co-occurrence rules. These features are listed in TABLE 2 above. Apart from the lexical features, the resources are readily provided by XIP: part of speech categories, dependency analysis and negation operation marks. At this stage, the system uses the lexical resource of domain specific terminology acquired by topic modeling, as described above, and the lists of words that instantiate the remaining lexical features in the development corpus. A vocabulary of anomaly words has not yet been fully developed, although some of the words (e.g. freeze) are recurring.

The rules specify the nature of the co-occurrence of the features in the sentences, which can be simple co-occurrence, any dependency relation, or a specific dependency relation. Whenever the features are assigned to verbs, nouns or adjectives, at least one dependency relation between two elements is required. This dependency relation is only specified in sentence type 3 as predication (i.e., subject or object dependency), otherwise it can be any dependency. When the features are assigned to adverbs or connectors, co-occurrence signals sufficient cohesion among the elements of the patterns.

Evaluation

The performance of the system was evaluated by comparing the automated classification results with the gold-standard classification of the 50 test posts of the corpus. In order to assess the role of discourse analysis, classification experiments were also performed on the different categories using a hybrid classifier.

Performance Against the Gold Standard

TABLE 7 shows the results of the system in terms of precision, recall and F1 measures for the different categories. The Null category is assigned when none of the discourse categories fires on the sentence. The accuracy measures as determined as follows:

Precision=fraction of the sentences that the system labels with the respective category (true and false positives, tp+fp) that are correctly labeled $$(\text{according to the annotators}) = \frac{tp}{tp+fp}.$$

Recall=fraction of the sentences that should be labeled with the category (true positives tp plus false negatives fn) that are actually labeled $$= \frac{tp}{tp+fp}.$$

$$F1 = 2 \cdot \frac{\text{precision} \cdot \text{recall}}{\text{precision} + \text{recall}}.$$

TABLE 7

Performance of the system for the different categories

|  | ANOMALY | HOWTO | PROPERTY | EXPLAN. | NULL | AVERAGE |
|---|---|---|---|---|---|---|
| Precision | 0.531 | 0.803 | 0.814 | 0.166 | 0.869 | 0.637 |
| Recall | 0.459 | 0.833 | 0.803 | 0.5 | 0.877 | 0.696 |
| F1 | 0.495 | 0.818 | 0.808 | 0.333 | 0.877 | 0.666 |

These results indicate that the patterns of the HOWTO and the PROPERTY categories capture fairly well the actual language patterns. The results for EXPLANATION cannot be considered as representative due to the fact that the test corpus only contained two gold-standard sentences in this category. As discussed earlier, the detection of the ANOMALY class is challenging due to the wide lexical and structural variety of the anomaly descriptions. Since the system implements part of the lexical resources required by the discourse patterns, the performance results are lower. An improvement of the results by the injection of more lexical resources is to be expected.

Performance in a Hybrid Classifier

As a way of assessing the role of the discourse analysis patterns in the detection of the categories experiments we performed using a hybrid classification system in which the category labels (in the XIP analysis output) were used as features.

The system includes the syntactic parsing component 52 based on XIP, to detect linguistically rich information (POS, syntactic dependencies, discourse patterns etc.) and a sentence categorizer 56 that associates predefined categories to sentences (a given sentence may have multiple categories associated to it). The syntactic parsing and categorization components provide linguistic information used as features by the classifiers 75, which yield the final output. The machine learning classification components are based on the standard classification library Liblinear. See, Fan, et al., "LIBLINEAR: A Library for Large Linear Classification," J. Mach. Learn. Res. 9, pp. 1871-1874, 2008. The sentence classifier is used to assign categories to sentences. For each sentence, the classifier takes, as input features, the bag of words in the sentence as well as information provided by the syntactic parsing component 52 and sentence categorizer 56. The output includes a list of categories corresponding to each sentence associated with their probabilities. In the pre-processing stage, stop words are removed (determinants, conjunctions). The L2-regularized logistic regression solver from the Liblinear library was used to train the classification model 75. Features include unigram, bigrams, POS, and discourse patterns extracted by the rule-based component 54.

A baseline classifier was first trained using various standard features (unigram, bigrams, part-of-speech). The best results were obtained by using bigrams and part-of-speech features. In order to test the role of the discourse patterns, in addition to the bigram and part-of-speech features, the output of the categorizer 56 was added. TABLE 8 provides a comparison of the results.

TABLE 8

Comparison of the output of two classifiers

|  |  | ANOMALY | HOWTO | PROPERTY | EXPLA-NATION | NULL | AVERAGE |
|---|---|---|---|---|---|---|---|
| Baseline Bigrams + POS | Prec. | 0.444 | 0.854 | 0.764 | 0 | 0.801 | 0.578 |
|  | Rec. | 0.108 | 0.759 | 0.732 | 0 | 0.925 | 0.505 |
|  | F1 | 0.276 | 0.806 | 0.748 | 0 | 0.862 | 0.534 |
| Bigrams + POS + Category features | Prec. | 0.5 | 0.883 | 0.854 | 1 | 0.767 | 0.8 |
|  | Rec. | 0.27 | 0.704 | 0.577 | 0.5 | 0.971 | 0.604 |
|  | F1 | 0.385 | 0.794 | 0.716 | 0.75 | 0.869 | 0.703 |

The discourse feature does not have a significant effect on classification for the HOWTO and PROPERTY categories. This may be expected, because these categories can be expressed with simple surface patterns, which the machine-learning algorithms are able to capture. The result for EXPLANATION is better using the discourse feature, however, since there are few cases in the corpus, reliable conclusions cannot be drawn.

The role of the discourse feature when used for classification is apparent for the ANOMALY category. The precision is better and the recall is more than the double. This result indicates the important role of discourse analysis in detecting this challenging category. These results are not directly comparable with those obtained without using the classifier (TABLE 4), since classifier training used a limited set of samples.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for categorizing an issue and outputting information based on the categorization, the method comprising:
for each of a plurality of categories of issue including an information request category and an anomaly category, providing a discourse model, the discourse models including a request discourse model which applies rules for identifying discourse patterns for identifying information requests in a text sequence and an anomaly discourse model which applies rules for identifying discourse patterns identifying anomalies in the text sequence, the discourse patterns configured for identify text sequences that meet the respective discourse pattern, at least one of the discourse patterns specifying that an instance of a domain term in a domain term vocabulary be present in the text sequence for the discourse pattern to be met, wherein there are at least two discourse patterns provided for the anomaly category, the at least two discourse patterns for the anomaly category being selected from the group consisting of:
a pattern specifying that a term from a predefined set of deviance-related terms be in a syntactic dependency with a term in the domain term vocabulary;
a pattern specifying that a term classed as deviance be in a syntactic dependency with a term in the domain term vocabulary;
a pattern specifying that a deviance aspect indicator co-occur with a negative element, wherein the negative element is in a syntactic dependency with a term in the domain term vocabulary;
a pattern specifying that a deviance indicator of contrast co-occur with a deviance aspect indicator and a predicate or argument, wherein the predicate or argument is in a syntactic dependency with a term in the domain term vocabulary; and
a pattern specifying that a deviance indicator of contrast co-occur with deviance aspect indicator and a predicate or argument, wherein the predicate or argument is in a syntactic dependency with a term in the domain term vocabulary,
wherein the syntactic dependencies in the patterns are identified with rules for identifying:
a subject syntactic dependency, which identifies a noun or noun phrase and a verb for which the noun or noun phrase is the subject of that verb in a sentence;
an object syntactic dependency, which identifies a noun or noun phrase and a verb for which the noun or noun phrase is the object of that verb in a sentence;
a predicate syntactic dependency, which identifies a dependency between a predicate and a noun or noun phrase; and
a negation syntactic dependency, which identifies a syntactic relation between a noun or noun phrase and a negative term selected from a term set of negative terms;
receiving an issue comprising a text sequence;
with a processor:
processing the text sequence with a syntactic parser which identifies syntactic dependencies between tokens of the text sequence, the syntactic parser including rules which tag instances of the domain terms in the domain term vocabulary,
applying the discourse patterns, at least some of the discourse patterns requiring a syntactic dependency between a term and one of the domain terms, and
categorizing the text sequence based on which of the discourse patterns are met by the text sequence of the received issue; and outputting information based on the categorization of the text sequence, wherein the outputting information comprises at least one of:
identifying a process for responding to the issue from a plurality of processes associated with different issue categories;
identifying a knowledge base from a plurality of knowledge bases for querying based on the categorization of the issue; and
querying a knowledge base or collection of web posts with the issue, wherein the query is also based on the categorization of the issue.

2. The system of claim 1, wherein the categories of issue include an anomaly category having at least one discourse pattern for identifying a deviation from normal behavior of an instance of a domain term, expressed by the author of the issue.

3. The method of claim 1, wherein the anomaly category is associated with a plurality of discourse patterns which are defined by the anomaly discourse model, the anomaly discourse model providing different discourse patterns with respective rules for identifying deviance.

4. The method of claim 1, wherein the issue categories include a plurality of information request categories.

5. The method of claim 1, wherein the information request category is selected from:
a how-to category;
a property category;
an explanation category; and
combinations thereof.

6. The method of claim 5, wherein the information request category includes a how-to category, and the at least one discourse pattern is selected from:
a pattern specifying that a direct or indirect question contains the word how in combination with a 1st person subject;
a pattern specifying that a direct or indirect question contains the word how to or way,
a pattern specifying that a direct or indirect question containing an instance of the lemma do has an instance of the lemma what as its direct object; and
combinations thereof.

7. The method of claim 5, wherein the information request category includes a property category, and the at least one discourse pattern is selected from:
a pattern specifying a direct or indirect yes-no question;
a pattern specifying a direct or indirect Wh-question, except when classed in the how-to category; and
combinations thereof.

8. The method of claim 5, wherein the information request category includes an explanation category, and the at least one discourse pattern is selected from:
a pattern specifying a direct or indirect question containing an instance of the lemma why;
a pattern specifying a direct or indirect question where an instance of the lemma cause has a subject or an object; and
combinations thereof.

9. The method of claim 1, further comprising applying rules for detection of direct and indirect questions in the text sequence.

10. A method for categorizing an issue and outputting information based on the categorization, the method comprising:
(I) for each of a plurality of categories of issue including an information request category and an anomaly category, providing a discourse model, the discourse models including a request discourse model which applies rules for identifying discourse patterns for identifying information requests in a text sequence and an anomaly discourse model which applies rules for identifying discourse patterns identifying anomalies in the text sequence, the discourse patterns configured for identify text sequences that meet the respective discourse pattern, at least one of the discourse patterns specifying that an instance of a domain term in a domain term vocabulary be present in the text sequence for the discourse pattern to be met;
(II) receiving an issue comprising a text sequence;
(III) with a processor, parsing the text sequence with a syntactic parser to:
(a) identify syntactic dependencies between tokens of the text sequence, the syntactic parser including rules which tag instances of the domain terms in the domain term vocabulary, and
(b) identify occurrences of syntactic dependencies between words of the text sequence from a predefined set of syntactic dependencies, at least some of the patterns specifying that the domain term be in a syntactic dependency, wherein the syntactic dependencies in the predefined set of syntactic dependencies are identified with rules, the rules including rules for identifying:
(i) a subject syntactic dependency, which identifies a noun or noun phrase and a verb for which the noun or noun phrase is the subject of that verb in a sentence,
(ii) an object syntactic dependency, which identifies a noun or noun phrase and a verb for which the noun or noun phrase is the object of that verb in a sentence,
(iii) a predicate syntactic dependency, which identifies a dependency between a predicate and a noun or noun phrase, and
(iv) a negation syntactic dependency, which identifies a syntactic relation between a noun or noun phrase and a negative term selected from a set of negative terms;
(IV) with a processor, applying the discourse patterns, at least some of the discourse patterns requiring a syntactic dependency between a term and one of the domain terms;
(V) with a processor, categorizing the text sequence based on which of the discourse patterns are met by the text sequence of the received issue; and
VI) outputting information based on the categorization of the text sequence, wherein the outputting information comprises at least one of:
(a) identifying a process for responding to the issue from a plurality of processes associated with different issue categories,
(b) identifying a knowledge base from a plurality of knowledge bases for querying based on the categorization of the issue, and
(c) querying a knowledge base or collection of web posts with the issue, wherein the query is also based on the categorization of the issue.

11. The method of claim 1, wherein the receiving an issue comprises receiving a collection of web posts each web post including an issue and at least one answer and wherein the output information includes categories for the issues which are used to label the post or to generate or update a knowledge base which includes questions and associated answers.

12. The method of claim 1, wherein there are at least three issue categories.

13. The method of claim 1, further comprising extracting the domain terms in the domain term vocabulary from a collection of issue sentences.

14. The method of claim 1, wherein the categorization includes extracting discourse pattern features based on the discourse patterns that are met by the text sequence and inputting the discourse pattern features into a classifier trained to classify text sequences or issues containing them based on the discourse pattern features.

15. The method of claim 1, wherein the text sequence is a single sentence.

16. A computer program product comprising a non-transitory recording medium storing instructions, which when executed on a computer, causes the computer to perform the method of claim 1.

17. A system for categorizing issues comprising:
a domain term vocabulary which includes a plurality of domain terms;
memory which, for each of a plurality of categories of issue, including an information request category and an anomaly category, stores a discourse model, the discourse models including a request discourse model which applies rules for identifying discourse patterns for identifying information requests in a text sequence and an anomaly discourse model which applies rules for identifying discourse patterns identifying anomalies in the text sequence, the discourse patterns configured for identify text sequences that meet the respective discourse pattern, at least one of the discourse patterns specifying that an instance of one of the domain terms in the domain term vocabulary be present in the text sequence for the pattern to be met;
a syntactic parser which identifies syntactic dependencies in an issue comprising a text sequence, including:
  (a) identifying syntactic dependencies between tokens of the text sequence, the syntactic parser including rules which tag instances of the domain terms in the domain term vocabulary, and
  (b) identify occurrences of syntactic dependencies between words of the text sequence from a predefined set of syntactic dependencies, at least some of the patterns specifying that the domain term be in a syntactic dependency, wherein the syntactic dependencies in the predefined set of syntactic dependencies are identified with rules, the rules including rules for identifying:
    (i) a subject syntactic dependency, which identifies a noun or noun phrase and a verb for which the noun or noun phrase is the subject of that verb in a sentence,
    (ii) an object syntactic dependency, which identifies a noun or noun phrase and a verb for which the noun or noun phrase is the object of that verb in a sentence,
    (iii) a predicate syntactic dependency, which identifies a dependency between a predicate and a noun or noun phrase, and
    (iv) a negation syntactic dependency, which identifies a syntactic relation between a noun or noun phrase and a negative term selected from a set of negative terms;
a discourse pattern extraction component which determines which of the discourse patterns are met by the text sequence;
a categorization component which categorizes the text sequence based on the discourse patterns which are met; and
an output component which outputs information based on the categorization of the text sequence, wherein the output component is configured for:
identifying a process for responding to the issue from a plurality of processes associated with different issue categories;
identifying a knowledge base from a plurality of knowledge bases for querying based on the categorization of the issue; and
querying a knowledge base or collection of web posts with the issue, wherein the query is also based on the categorization of the issue.

\* \* \* \* \*